United States Patent
Ryu et al.

(10) Patent No.: US 10,990,789 B2
(45) Date of Patent: Apr. 27, 2021

(54) DISPLAY APPARATUS INCLUDING LIGHT-RECEIVING PIXEL AREA

(71) Applicant: LG Display Co., Ltd., Seoul (KR)

(72) Inventors: Sungpil Ryu, Paju-si (KR); Hyung-Seok Bang, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 16/586,924

(22) Filed: Sep. 28, 2019

(65) Prior Publication Data

US 2020/0104563 A1    Apr. 2, 2020

(30) Foreign Application Priority Data

Sep. 28, 2018  (KR) .................. 10-2018-0115676
Dec. 31, 2018  (KR) .................. 10-2018-0173669

(51) Int. Cl.
*G06K 9/00* (2006.01)
*G06F 3/042* (2006.01)
*F21V 8/00* (2006.01)

(52) U.S. Cl.
CPC ....... *G06K 9/00033* (2013.01); *G02B 6/0053* (2013.01); *G02B 6/0055* (2013.01); *G02B 6/0068* (2013.01); *G06F 3/0421* (2013.01)

(58) Field of Classification Search
CPC .............. G06K 9/00033; G06K 9/0004; G06F 3/0421; G06F 3/042; G02B 6/0068; G02B 6/0055; G02B 6/0053; G09G 3/3225; G09G 3/32
See application file for complete search history.

(56) References Cited

U.S. PATENT DOCUMENTS

2019/0006440 A1*    1/2019  Sun .................. H01L 27/3248

* cited by examiner

*Primary Examiner* — Christopher J Kohlman
(74) *Attorney, Agent, or Firm* — Polsinelli PC

(57) ABSTRACT

A display apparatus including a plurality of display pixel areas and a plurality of light-receiving pixel areas which are arranged in a display area in which an image is displayed, comprises an image-displaying unit configured to display the image and including a plurality of electro-luminescence devices which corresponds to the plurality of display pixel areas; and a light-sensing unit disposed below the image-displaying unit, wherein the light-sensing unit comprises a plurality of light-receiving devices corresponding to the plurality of light-receiving pixel areas; a light shielding film disposed on a transparent film that covers the plurality of light-receiving devices; and a plurality of opening patterns corresponding to the plurality of light-receiving devices and formed in the light shielding film.

24 Claims, 21 Drawing Sheets

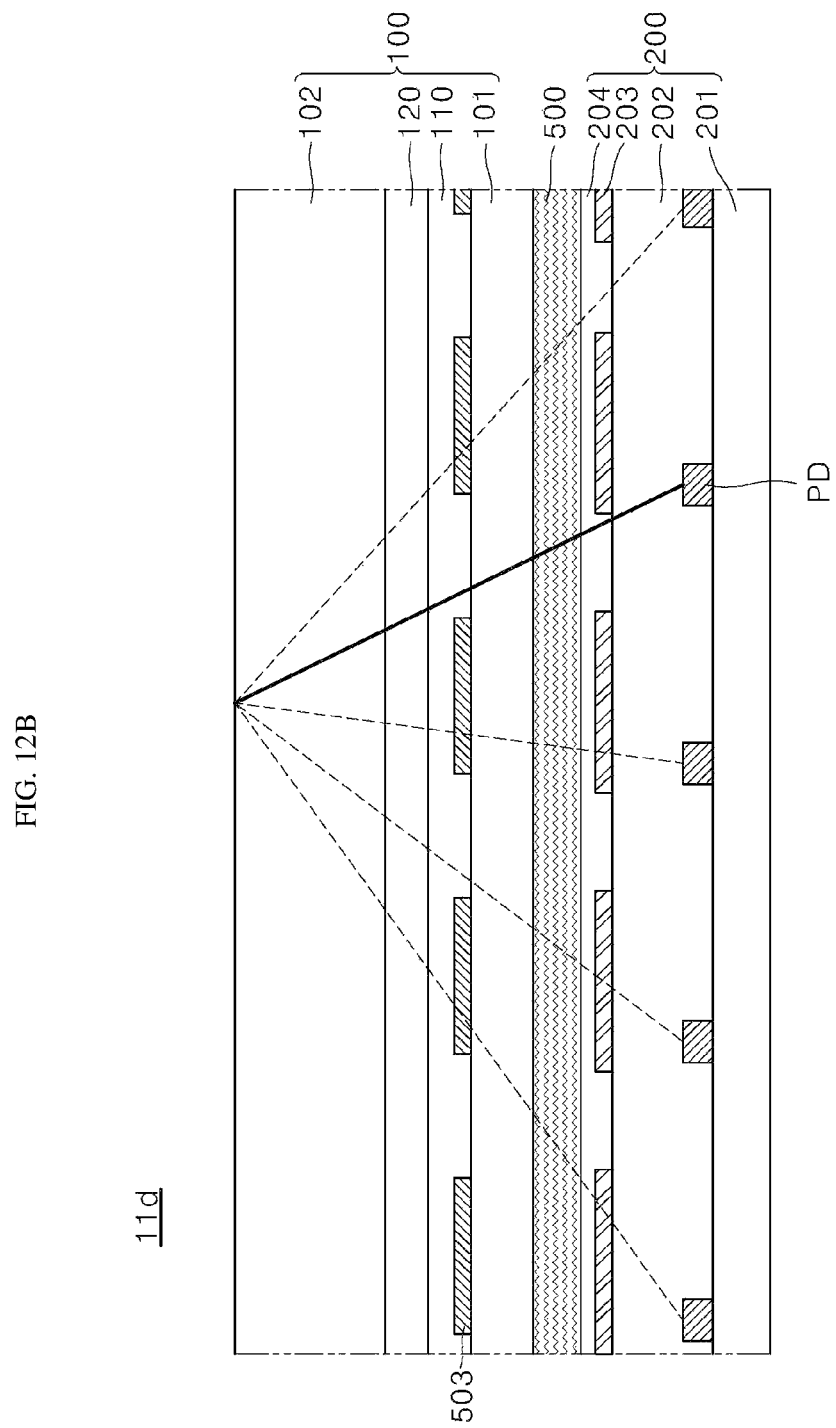

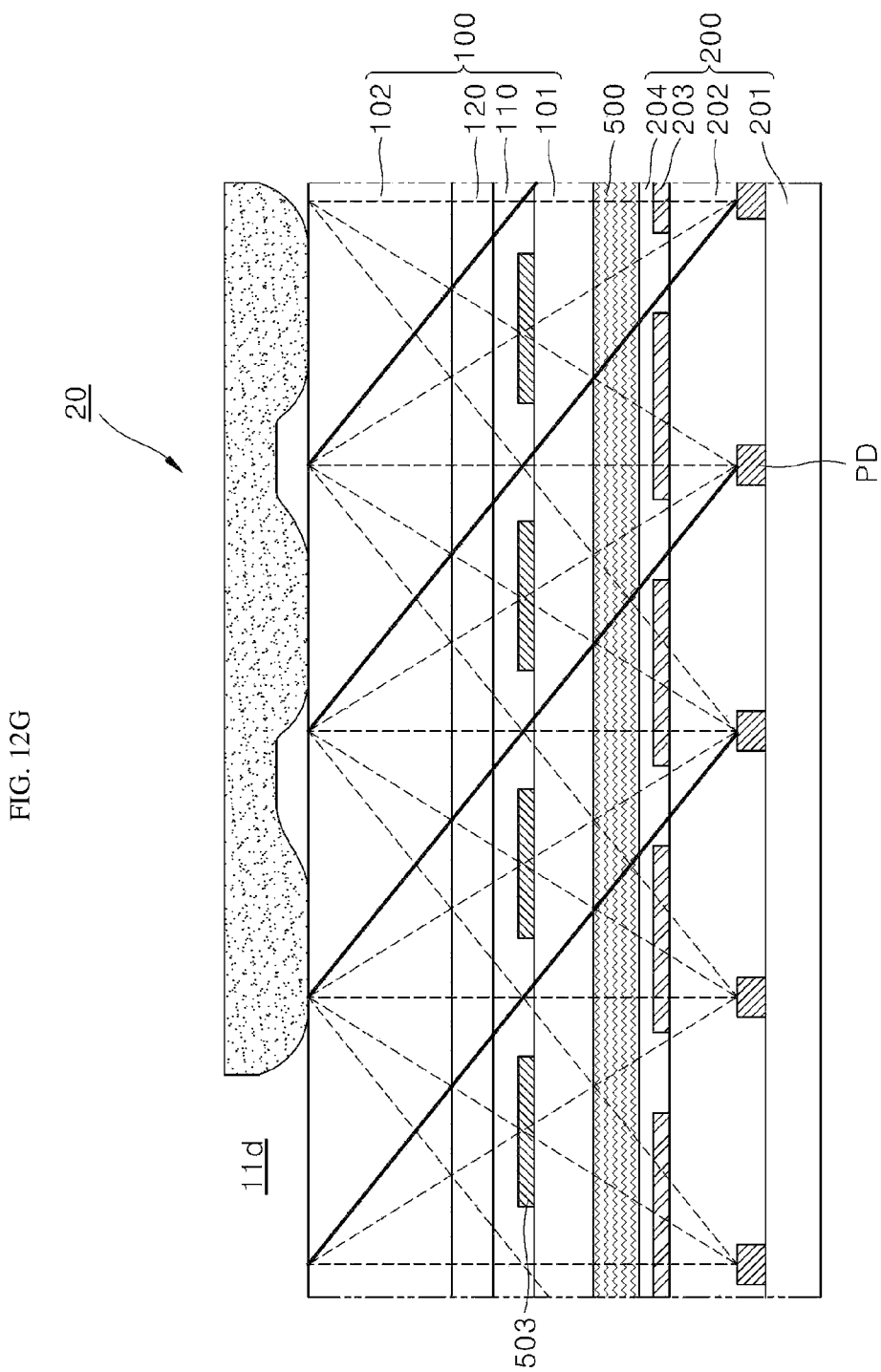

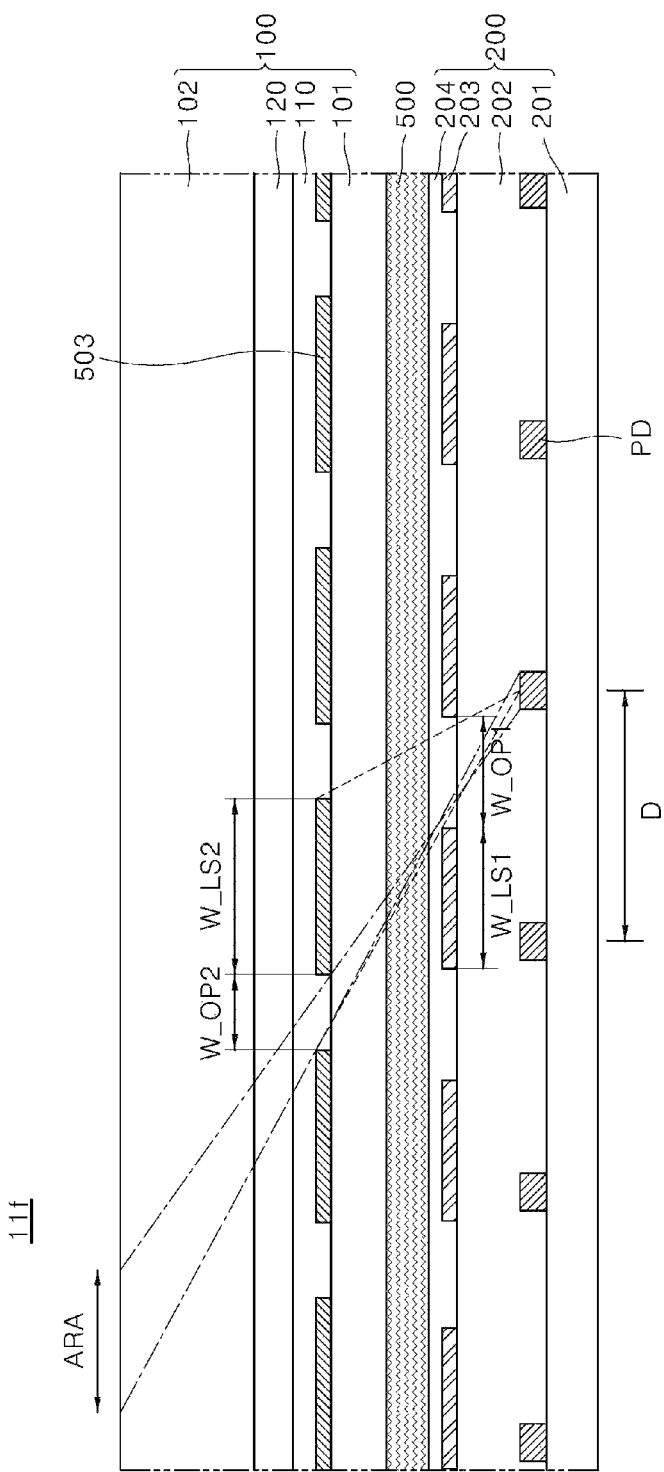

DISPLAY APPARATUS INCLUDING LIGHT-RECEIVING PIXEL AREA

CROSS REFERENCE TO RELATED APPLICATION

This application claims priority to and the benefit of Korean Patent Application No. 10-2018-0115676 filed on Sep. 28, 2018 and Korean Patent Application No. 10-2018-0173669 filed on Dec. 31, 2018, which are hereby incorporated by reference in their entireties.

BACKGROUND

Field of the Disclosure

The present disclosure relates to a display apparatus, and more particularly, to a display apparatus including a light-receiving pixel area for sensing a touch and/or a fingerprint. Although the present disclosure is suitable for a wide scope of applications, it is particularly suitable for improving a signal-to-noise ratio of the display apparatus including the light-receiving pixel area.

Description of the Background

A display apparatus has been applied to a variety of electronic devices such as a TV set, a mobile phone, a laptop, a tablet and the like. Accordingly, research into a thin display apparatus, a lightweight display apparatus, a display apparatus which consumes less electricity and the like has been underway.

Display apparatuses may be classified into a liquid crystal display (LCD) apparatus, a plasma display panel (PDP) apparatus, a field emission display (FED) apparatus, an electro-wetting display (EWD) apparatus, an electro-luminescence display device (ELDD) and the like.

In general, display apparatuses include display panels (hereinafter referred to as "display panel" or "panel") which emit light for displaying images. Usual display panels include a pair of substrates which faces each other, and a light-emitting material or a liquid crystal material which is disposed between the pair of substrates.

The display apparatuses may include a sensor for sensing a touch such that user convenience can be enhanced. Thus, the display apparatuses can be applied to a wider range of products. By doing so, the sensor can sense a location of a touch which is input onto a display surface, and input can be performed. Accordingly, the display apparatuses including touching sensor may eliminate an additional input device such as a mouse, a keyboard and the like.

Types of comprising sensors for sensing a touch may involve an add-on type, an on-cell type, an in-cell type and the like. In the add-on type, a touch sensing panel which includes sensors for sensing a touch arranged in a matrix form is additionally prepared, and the additional touch sensing panel is disposed above or below a display panel. In the on-cell type, sensors for sensing a touch are disposed above a light-emitting material or a liquid crystal material between a pair of substrates of a display panel. In the in-cell type, a thin-film transistor array for driving a plurality of pixels and sensors for sensing a touch are integrated above a substrate.

Methods for sensing a touch may include a method for sensing a location at which resistance is varied (hereinafter referred to as "resistance method"), a method for sensing a location at which electrostatic capacity is varied (hereinafter referred to as "electrostatic capacity method"), a method for sensing a location at which an amount of light is varied (hereinafter referred to as "optical method", and the like.

In the optical method, a difference in reflectance of light corresponding to a difference in a refractive index of each location of a medium which contacts a surface of a panel is sensed, to sense touches or patterns of fingerprints. For instance, in an area not touched by skin, internal light is reflected at high reflectance and input to a light-receiving device corresponding to the area. In an area contacted by skin, a large amount of the internal light is transmitted or absorbed, and only a small amount of the internal light is input to a light-receiving device corresponding to the area contacted by skin. In this case, a difference in amounts of light is sensed to recognize a pattern of a finger print, or a touch.

In the optical method, signal light generated in a panel as well as noise light from the outside of a panel may be input to the light-receiving device. In this case, there is a need for a method of improving a signal-to-noise ratio by increasing a ratio of signal light to noise light. The above information disclosed in this Background section is only for enhancement of understanding of the background of the described technology and therefore it may contain information that does not form prior art that is already known in this country to a person of ordinary skill in the art.

SUMMARY

Accordingly, the present disclosure is directed to a display apparatus including a light-receiving pixel area that substantially obviates one or more of problems due to limitations and disadvantages of the prior art.

More specifically, the present disclosure provides a display apparatus including a light-receiving device that can enhance a signal-to-noise ratio.

The present disclosure is not limited to what has been described. Other aspects and advantages that have not been mentioned may be clearly understood from the following description and may be more clearly understood from aspects set forth herein. Further, it will be understood that the aspects and advantages of the present disclosure may be realized via means and a combination thereof that are described in the appended claims.

In one aspect of the present disclosure, a display apparatus including a plurality of display pixel areas and a plurality of light-receiving pixel areas which are arranged in a display area in which an image is displayed, comprises an image-displaying unit configured to display the image and including a plurality of electro-luminescence devices which corresponds to the plurality of display pixel areas; and a light-sensing unit disposed below the image-displaying unit, wherein the light-sensing unit comprises a plurality of light-receiving devices corresponding to the plurality of light-receiving pixel areas; a light shielding film disposed on a transparent film that covers the plurality of light-receiving devices; and a plurality of opening patterns corresponding to the plurality of light-receiving devices and formed in the light shielding film.

In another aspect of the present disclosure, a display apparatus is provided, comprising: a plurality of light-receiving devices; a first light shielding film configured to cover the plurality of light-receiving devices and including a plurality of first opening patterns which correspond to the plurality of light-receiving devices; a second light shielding film configured to cover the first light shielding film and including a plurality of second opening patterns which correspond to the plurality of light-receiving devices and the plurality of first opening patterns; and a plurality of electro-luminescence devices disposed above the second light shielding film, wherein light emitted from each of the electro-luminescence devices is received in the each of the light-receiving devices through a path which penetrates each of the first opening patterns and each of the second opening patterns.

According to a first aspect, a display apparatus includes an image-displaying unit which includes a plurality of electro-luminescence devices, and a light-sensing unit disposed below the image-displaying unit. The light-sensing unit includes a plurality of light-receiving devices corresponding to a plurality of light-receiving pixel areas, a light shielding film disposed above a transparent film covering the plurality of light-receiving devices, and a plurality of opening patterns corresponding to the plurality of light-receiving devices and penetrating the light shielding film.

The image-displaying unit may further include a transparent cover member configured to cover the plurality of electro-luminescence devices.

At least portion of light from the plurality of electro-luminescence devices may be emitted outward through an upper surface of the transparent cover member. Additionally, another portion of the light emitted from the plurality of electro-luminescence devices may be reflect from the upper surface of the transparent cover member contacting a predetermined medium, and may be input to each of the light-receiving devices through each of the opening patterns A collection of points at which extension lines which connect an edge of each opening pattern and an edge of each light-receiving device meet the upper surface of the transparent cover member draws a closed curve. In this case, an inner area of a closed curve with a largest possible surface area is referred to as an available light-receiving area. That is, each light-receiving device may absorb at least portion of light which is generated in the effective light-receiving area of the upper surface of the transparent cover member, which corresponds to each opening pattern.

Further, the edge of each light-receiving device may denote an edge of a sensing area of the light-receiving device, which substantially has a light-receiving ability.

Among the lines which connect the edge of each opening pattern (OP) and the edge of each light-receiving device (PD), a line which forms a minimum angle together with a normal line of the upper surface of the transparent cover member 102 is referred to as an opening-pattern available minimum incidence path (D_OP). An angle ($\theta_{OP}$) (hereinafter referred to as "opening-pattern minimum available incidence angle") which is formed by the opening-pattern available minimum incidence path (D_OP) and the normal line of the upper surface of the transparent cover member 102 is greater than a predetermined critical angle. The predetermined critical angle is determined by a medium which contacts the upper surface of the transparent cover member, and the transparent cover member. By doing so, each light-receiving device may optionally absorb light of the effective light-receiving area which corresponds to each opening pattern. Accordingly, among light which proceeds in a panel, noise light which is unnecessary for sensing a touch and/or a fingerprint is prevented from being recklessly input to the light-receiving device, thereby improving a signal-to-noise ratio in relation to noise light. Further, input of light (hereinafter referred to as "external light") which is input from outside the upper surface of the transparent cover member to each light-receiving device may be minimized, thereby improving a signal-to-noise ratio in relation to external light.

A display apparatus according to aspects of the present disclosure includes a light-sensing unit which is disposed below an image-displaying unit. The light-sensing unit includes a plurality of light-receiving devices, a light shielding film which covers the plurality of light-receiving devices, and a plurality of opening patterns which corresponds to the plurality of light-receiving devices and which penetrates the light shielding film.

As described above, with the add-on type light-sensing unit, loss of light of the image-displaying unit, which is caused by a light-sensing unit, may be prevented.

The light shielding film which covers the plurality of light-receiving devices may minimize input of noise light outside and/or inside the apparatus to each light-receiving device, thereby improving a signal-to-noise ratio. The noise light denotes light except for signal light which is required for sensing a touch and/or a fingerprint.

Additionally, light of an effective light-receiving area which corresponds to each opening pattern may be optionally input to each light-receiving device. That is, an incidence angle of light which is input to the light-receiving device may be adjusted by the opening pattern. By doing so, in implementing functions of sensing a fingerprint and/or sensing a touch and the like, optical noise may be reduced, thereby improving a signal-to noise ratio further.

Further, a shape and size of the available sensing area which are determined on the basis of geometric structures of an opening pattern, a light-receiving device and a transparent cover member are properly set, thereby enhancing accuracy in obtaining a pattern of an object subject to sensing such as a pattern of a fingerprint, an area touched by a finger and the like.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIGS. 12A to 12H are views illustrating area B in FIG. 11;

FIG. 14 is a view illustrating another modified fifth aspect of the present disclosure.

DETAILED DESCRIPTION OF THE DISCLOSURE

Figure 1:
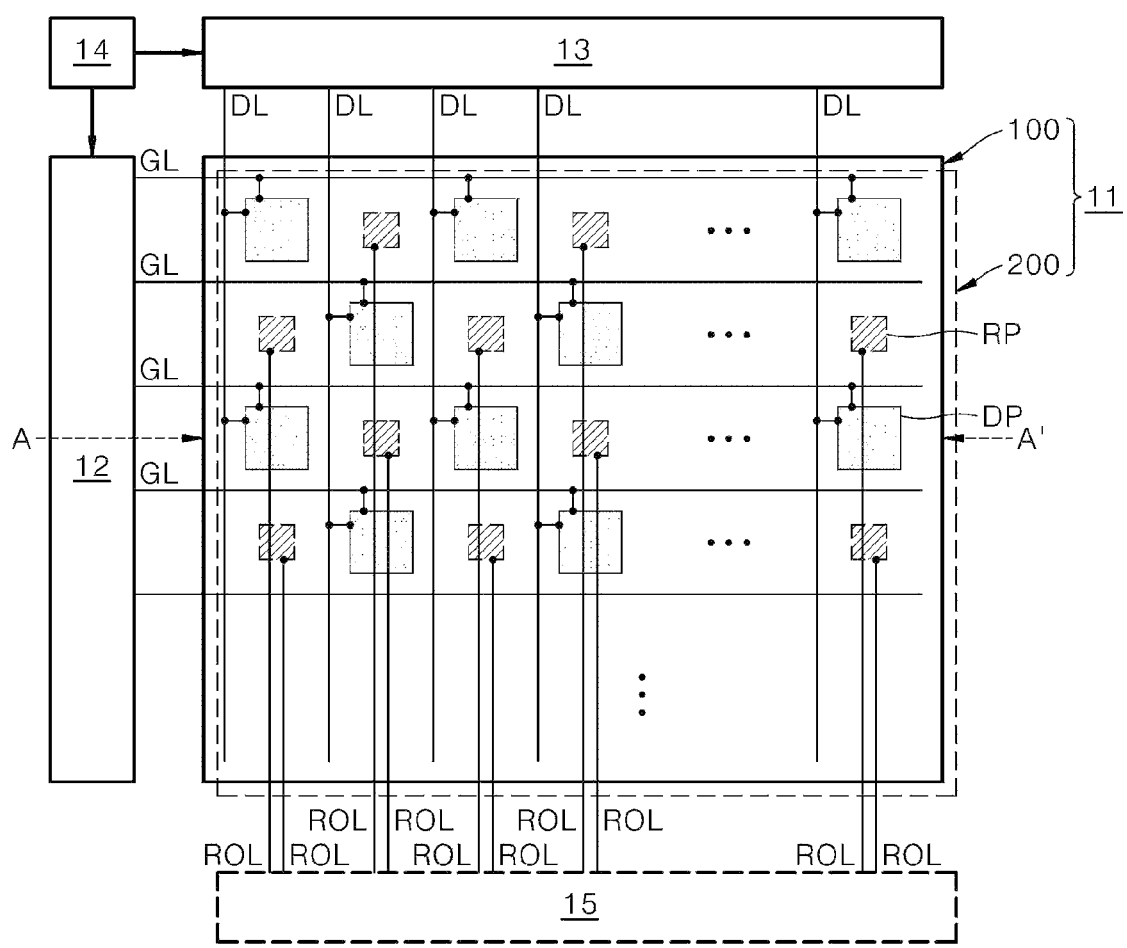
FIG. 1 is a view illustrating a display apparatus according to an aspect of the present disclosure.

The above-described objectives, features and advantages are specifically described hereunder with reference to the attached drawings. Accordingly, one having ordinary skill in the art may readily implement the technical spirit of the present disclosure. Further, in describing the present disclosure, publicly-known technologies in relation to the disclosure are not specifically described if they are deemed to make the gist of the disclosure unnecessarily vague. Below, aspects are described with reference to the attached drawings. In the drawings, like reference numerals denote like or similar elements.

Below, a display apparatus according to each of the aspects is described with reference to the attached drawings.

A display apparatus according to a first aspect is described with reference to FIGS. 1 to 5.

Figure 2:
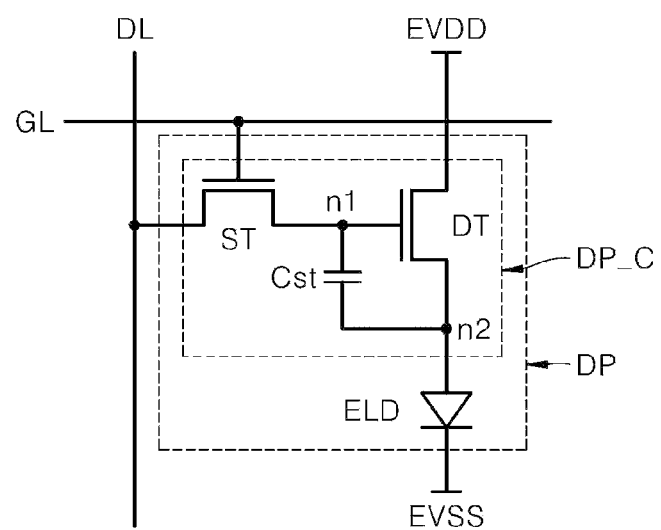
FIG. 2 is a view illustrating an example of an equivalent circuit corresponding to the display pixel area in FIG. 1.
Figure 3:
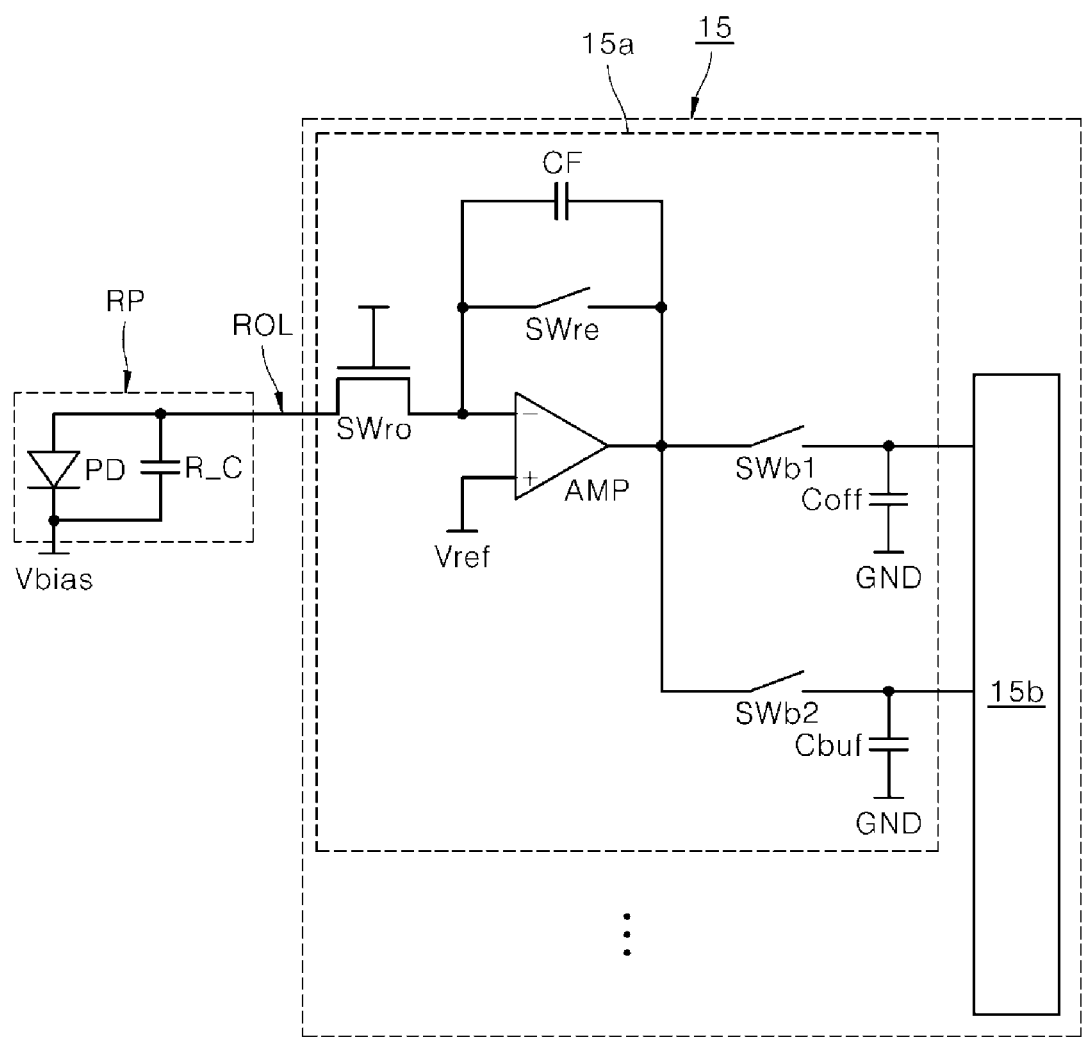
FIG. 3 is a view illustrating an example of an equivalent circuit corresponding to a portion of the light-receiving pixel area and the readout driving unit in FIG. 1.

FIG. 1 is a view illustrating a display apparatus according to the first aspect of the present disclosure, FIG. 2 is a view illustrating an example of an equivalent circuit corresponding to the display pixel area in FIG. 1, and FIG. 3 is a view illustrating an example of an equivalent circuit corresponding to a portion of the light-receiving pixel area and the readout driving unit in FIG. 1.

Figure 4:
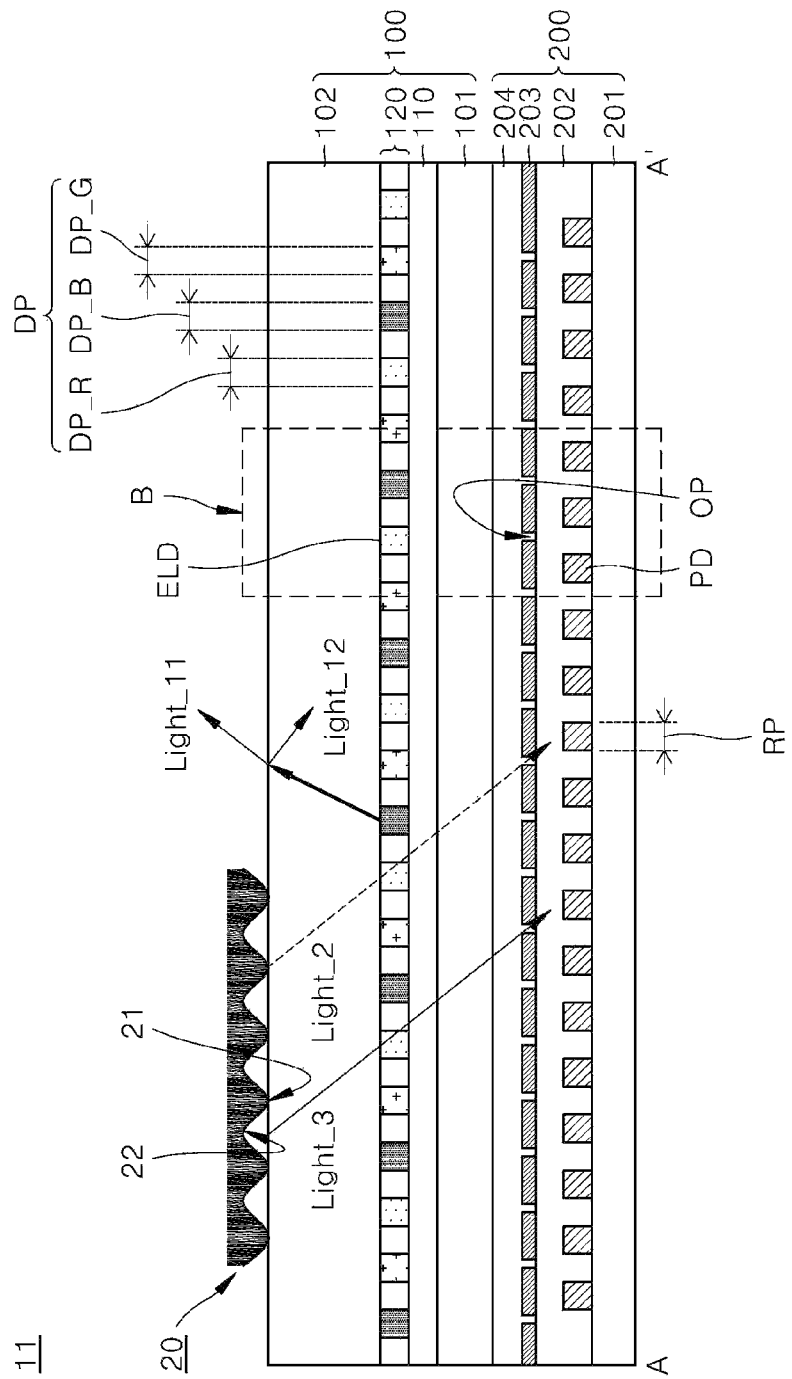
FIG. 4 is a cross-sectional view illustrating a of a display panel, which corresponds to area A-A' in FIG. 1 according to a first aspect of the present disclosure.
Figure 5:
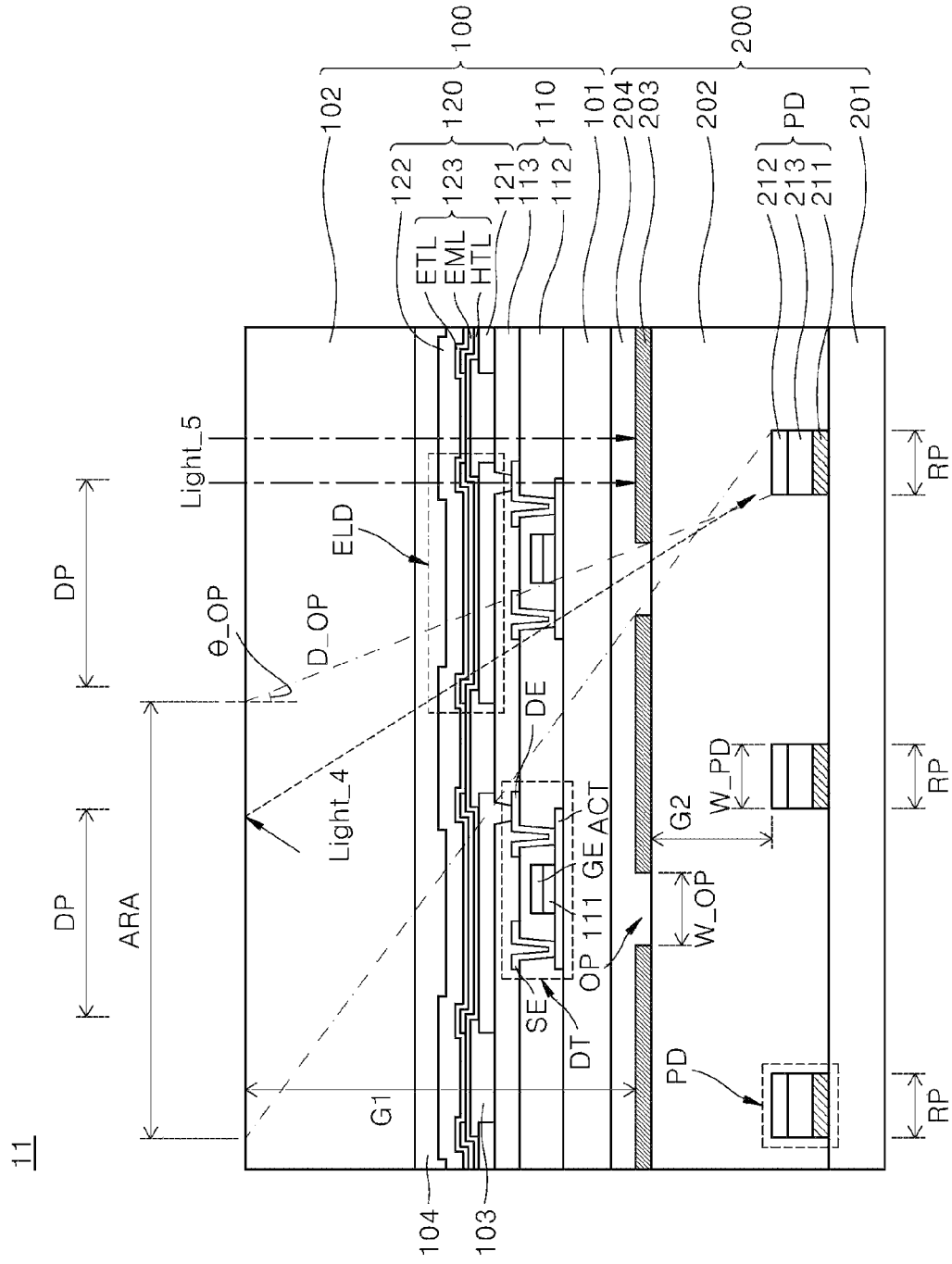
FIG. 5 is a view illustrating area B in FIG. 4.

FIG. 4 is a cross-sectional view illustrating a display panel, which corresponds to area A-A' in FIG. 1, and FIG. 5 is a view illustrating area B in FIG. 4.

As illustrated in FIG. 1, the display apparatus 10 according to the first aspect includes a display panel 11 which includes a display area in which an image is displayed, and panel driving units (12, 13, 14, and 15) which drive the display panel 11.

The display panel 11 includes a plurality of display pixel areas DP and a plurality of light-receiving pixel areas RP which are arranged in the display area.

Specifically, the display panel 11 includes an image-displaying unit 100 which emits light for displaying an image, and a light-sensing unit 200 which is disposed below the image-displaying unit 100 and which performs optical sensing to sense a touch or to sense a fingerprint.

The image-displaying unit 100 includes the plurality of display pixel areas DP which are arranged in a matrix form in the display area.

The image-displaying unit 100 includes a pair of substrates (invisible) which face each other and which are bonded to each other, and a light-emitting material or a liquid crystal material which is disposed between the pair of substrates. Additionally, the image-displaying unit 100 further includes a thin-film transistor array which is disposed above the substrate and which drives the plurality of display pixel areas DP. The thin-film transistor array includes a plurality of thin-film transistors corresponding to the plurality of display pixel areas DP and various signal lines.

The image-displaying unit 100 may include a plurality of electro-luminescence devices (ELD in shown FIG. 2) corresponding to the plurality of display pixel areas DP. The plurality of electro-luminescence devices ELD are disposed above the thin-film transistor array (reference numeral 110 shown in FIG. 4).

The light-sensing unit 200 includes the plurality of light-receiving pixel areas RP which are arranged in a matrix form.

The light-sensing unit 200 includes a plurality of light-receiving devices (PD in shown FIG. 3) corresponding to the plurality of light-receiving pixel areas RP. Each light-receiving device PD absorbs at least portion of light which is input to the device PD, and outputs detection signals corresponding to an amount of the absorbed light. The light-receiving device PD may be implemented as a PIN diode which includes a P-I-N junction semiconductor material.

The image-displaying unit 100 of the display panel 11 includes gate lines GL and data lines DL which are connected to the plurality of display pixel areas DP. For instance, each of the gate lines GL may correspond to each horizontal line which consists of the display pixel areas which are horizontally arranged in parallel among the plurality of display pixel areas DP. Each of the data lines DL may correspond to each perpendicular line which consists of the display pixel areas which are perpendicularly arranged in parallel among the plurality of display pixel areas DP.

The light-sensing unit 200 of the display panel 11 includes readout lines ROL which are connected to the plurality of light-receiving pixel areas RP.

Each of the readout lines ROL may correspond to each of the light-receiving pixel areas RP. However, this is only an example. The light-sensing unit 200 may further include a thin-film transistor which is disposed between the readout line ROL and each light-receiving pixel area RP, and a sensing scan line for turning on the thin-film transistor, on the basis of a driving method of the plurality of light-receiving pixel areas RP.

The panel driving unit (12, 13, 14, and 15) may include a gate driving unit 12 which drives the gate line GL, a data driving unit 13 which drives the data line DL, a timing controller 14 which controls timing of driving the gate driving unit 12 and the data driving unit 13, and a readout driving unit 15 which drives the readout line ROL.

For instance, the gate driving unit 12 consecutively supplies gate signals to the gate line GL on the basis of gate driving initiation signals and gate clock signals of the timing controller. In this case, a switching thin-film transistor (ST in shown FIG. 2) of the display pixel area DP is turned on, based on the gate signals.

The data driving unit 13 supplies data signals of each display pixel area DP to each data line DL on the basis of data driving initiation signals and data clock signals of the timing controller 14.

The readout driving unit 15 performs readout of detection signals corresponding to each light-receiving pixel area RP.

As illustrated in FIG. 2, when the image-displaying unit (reference numeral 100 shown in FIG. 1) includes the plurality of electro-luminescence devices ELD corresponding to the plurality of display pixel areas DP, each display pixel area DP includes an electro-luminescence device ELD, and a pixel circuit (DP_C; a drive circuit part of a display pixel) for supplying driving current to the electro-luminescence device ELD.

The pixel circuit DP_C includes a driving transistor DT which is disposed in series with the electro-luminescence device ELD between a first driving power supply line EVDD and a second driving power supply line EVSS, a switching transistor ST which is disposed between the driving transistor DT and the data line DL, and a storage capacitor Cst which is disposed between a first node n1 and a second node n2. The first node n1 is disposed between a gate electrode of the driving transistor DT and the switching transistor ST, and the second node n2 is disposed between the driving transistor DT and the electro-luminescence device ELD.

In the pixel circuit DP_C, when turned on based on a gate signal of the gate line GL, the switching transistor ST delivers a data signal of the data line DL to the first node n1. The storage capacitor Cst is charged on the basis of the data signal. In this case, the driving transistor DT is turned on, based on charging voltage of the storage capacitor Cst, and driving current generated by the turned-on driving transistor DT is supplied to the electro-luminescence device ELD.

However, this is only an example. The pixel circuit DP_C may have a structure in which a compensating circuit which compensates a threshold voltage deviation (Δ Vth) of the driving transistor DT, and the like are further included.

As illustrated in FIG. 3, each light-receiving pixel area RP includes a light-receiving device (PD; a pin diode). Additionally, each light-receiving pixel area RP may further include a light-receiving capacitor R_C which connects in parallel to the light-receiving device PD. The light-receiving capacitor R_C may be a parasitic capacitor of the light-receiving device PD.

The light-receiving device PD connects between a bias power supply line Vbias and the readout line ROL. For example, when incident light is input to the light-receiving device PD, electron-hole pairs are generated in a P-I-N junction of the light-receiving device in response to the incident light. In this case, electrons of the electron-hole pairs move on the basis of bias power supply Vbias. Accordingly, detection signals which correspond to an amount of light input to the light-receiving device PD are generated.

The readout driving unit 15 includes a data detecting unit 15a which corresponds to each readout line ROL, and a detected-image-signal generating unit 15b which generates a detected image signal on the basis of output of the data detecting unit 15a.

The data detecting unit 15a includes an amplifier AMP which corresponds to each readout line ROL, a readout switch SWro which is disposed between the readout line ROL and the amplifier AMP, a feedback capacitor CF and a feedback reset switch SWre which correspond to the amplifier AMP, an offset capacitor Coff and a buffer capacitor (Cbuf; a detection signal capacitor) which correspond to an output terminal of the amplifier AMP, a 1st buffer switch SWb1 which is disposed between the amplifier AMP and the offset capacitor Coff, and a 2nd buffer switch SWb2 which is disposed between the amplifier AMP and the buffer capacitor (Cbuf).

A first input terminal (−) of the amplifier AMP connects with the readout line ROL through the readout switch SWro. Accordingly, when the readout switch SWro is turned on, detection signals which correspond to each light-receiving pixel area RP are input to the first input terminal (−) of the amplifier AMP through the readout line ROL.

Predetermined reference signals Vref are input to a second input terminal (+) of the amplifier AMP.

The feedback capacitor CF is disposed between the first input terminal (−) and the output terminal of the amplifier AMP. Accordingly, gain between the first input terminal (−) and the output terminal of the amplifier AMP corresponds to capacitance of the feedback capacitor CF.

The feedback reset switch SWre is disposed in parallel with the feedback capacitor CF between the first input terminal (−) and the output terminal of the amplifier AMP. The feedback reset switch SWre is to detect offset signals which correspond to noise of the amplifier AMP.

When the feedback reset switch SWre and the 1st buffer switch SWb1 are turned on in the state in which the readout switch SWro is turned off, the offset capacitor Coff is charged based on offset signals which correspond to noise of the amplifier AMP. This operation in which the offset capacitor Coff is charged based on the offset signal may be performed during a period for initialization which is carried out before each of the sensing periods in the data detecting unit 15a corresponding to the entire readout line ROL.

When the readout switch SWro is turned on, detection signals of each light-receiving pixel area RP are input to the first input terminal (−) of the amplifier AMP, and amplified detection signals are output from the output terminal of the amplifier AMP. Additionally, when the 2nd buffer switch SWb2 is turned on, the buffer capacitor Cbuf is charged based on the amplified detection signals.

The detected-image-signal generating unit 15b connects to the offset capacitor Coff and the buffer capacitor Cbuf, and generates detected image signals on the basis of offset signals and amplified detection signals which are output from each data detecting unit 15a. For instance, the detected-image-signal generating unit 15b may generate a brightness level signal which corresponds to an amount of light input to each light-receiving pixel area RP on the basis of offset signals and amplified detection signals output from each data detecting unit 15a, and may generate detected image signals based on a combination of a plurality of brightness level signals which correspond to the plurality of light-receiving pixel areas RP.

However, the data detecting unit 15a is an exemplary circuit diagram, and the present disclosure is not limited to this. Further, a few aspects of the present disclosure may include data detecting units which are modified in different forms to perform substantially the same functions.

As illustrated in FIG. 4, a display panel 11 includes an image-displaying unit 100 which includes a plurality of electro-luminescence devices ELD corresponding to a plurality of display pixel areas (DP in FIG. 1) arranged in a display area in a matrix form, and a light-sensing unit 200 which is disposed below the image-displaying unit 100.

The image-displaying unit 100 includes a first substrate 101, a thin-film transistor array 110 which is disposed above the first substrate 101 and which includes thin-film transistors (ST and DT in FIG. 2) corresponding to the plurality of display pixel areas DP, a plurality of electro-luminescence devices ELD which are disposed above the thin-film transistor array 110, and a transparent cover member 102 which covers the plurality of electro-luminescence devices ELD.

Additionally, the image-displaying unit 100 may further include an organic device protective film (reference numeral 104 shown in FIG. 5) which is disposed between the plurality of electro-luminescence devices ELD and the transparent cover member 102. The organic device protective film 104 may include an encapsulation layer which prevents moisture and/or oxygen from infiltrating the plurality of electro-luminescence devices ELD.

The transparent cover member 102 may include a material such as glass, reinforced glass, reinforced plastics, and the like that can protect the display panel 11.

In the image-displaying unit 100, at least portion of light Light_11 from at least one of the plurality of electro-luminescence devices ELD is emitted outward through a display surface corresponding to an upper surface of the transparent cover member 102 exposed to the outside, and another portion of light Light_12 from at least one electro-luminescence device ELD reflects toward the light-sensing unit 200 from the upper surface of the transparent cover member 102.

For instance, the plurality of display pixel areas DP may include a red display pixel area DP_R in which red light is emitted, a green display pixel area DP_G in which green light is emitted, and a blue display pixel area DP_B in which blue light is emitted.

In this case, the electro-luminescence device (ELD in FIG. 2) corresponding to each display pixel area DP may be a device which emits any one of red, green, and blue.

That is, an electro-luminescence layer of the electro-luminescence device ELD corresponding to the red display pixel area DP_R may include a red dopant.

Likewise, an electro-luminescence layer of the electro-luminescence device ELD corresponding to the green display pixel area DP_G may include a green dopant.

An electro-luminescence layer of the electro-luminescence device ELD corresponding to the blue display pixel area DP_B may include a blue dopant.

Electro-luminescence layers of the plurality of electro-luminescence devices ELD corresponding to the plurality of display pixel areas DP may also be a layer which emits white light. In this case, the image-displaying unit 100 may further include a color filter corresponding to each display pixel area DP.

That is, the image-displaying unit 100 may further include a red color filter corresponding to the red display pixel area DP_R, a green color filter corresponding to the green display pixel area DP_G, and a blue color filter corresponding to the blue display pixel area DP_B.

The light-sensing unit 200 is disposed below the image-displaying unit 100. That is, the light-sensing unit 200 is disposed below the first substrate 101 of the image-displaying unit 100. Accordingly, the thin-film transistor array 110 is disposed on one surface of the first substrate 101, and another surface of the first substrate 101 faces the light-sensing unit 200.

Additionally, the display panel 11 may further include an adhering unit (invisible) which is disposed between the image-displaying unit 100 and the light-sensing unit 200.

The light-sensing unit 200 includes a second substrate 201, a plurality of light-receiving devices PD which are disposed above the second substrate 201, a transparent film 202 which covers the plurality of light-receiving devices PD, a light shielding film 203 which is disposed above the transparent film 202, and a plurality of opening patterns OP which correspond to the plurality of light-receiving devices PD and which penetrate the light shielding film 203. Additionally, the light-sensing unit 200 may further include a pattern protective film 204 which covers the plurality of opening patterns OP. Each light-receiving device PD and each opening pattern OP are described below with reference to FIG. 5.

A gap between the plurality of light-receiving pixel areas RP, and a width of each of the light-receiving pixel areas RP may be freely adjusted on the basis of an object subject to sensing. For example, a gap between the light-receiving pixel areas RP may be less than a gap between ridges of a fingerprint to implement the function of sensing a fingerprint. As an example, an accurate and fine degree of the light-receiving pixel area RP may be 300 dpi (dots per inch) or more, and particularly, may be 400 dpi or more.

When the plurality of light-receiving pixel areas (RP in FIG. 1) are driven in an active matrix manner, the light-sensing unit 200 may further include a plurality of thin-film transistors which are disposed above the second substrate 201 and which correspond to the plurality of light-receiving pixel areas RP. Like the thin-film transistor array 110 of the image-displaying unit 100, the thin-film transistor array of the light-sensing unit 200 may consist of metallic lines and a semiconductor layer, and may include signal lines which drive the plurality of light-receiving pixel areas RP and a thin-film transistor array.

As described above, at least portion Light_12 of light Light_11 which proceeds in the display panel 11 by the plurality of electro-luminescence devices ELD and the like may reflect toward the light-sensing unit 200 from the upper surface of the transparent cover member 102, which contacts a predetermined medium (e.g., air). Light which has an incidence angle more than or equal to a critical angle of total internal reflection, which corresponds to a refractive index of the transparent cover member 102 and corresponds to a refractive index of a medium contacting the upper surface of the transparent cover member 102, may totally reflect on the upper surface of the transparent cover member 102.

An amount of light Light_12 which reflects toward the light-sensing unit 200 from each location of the upper surface of the transparent cover member 102 corresponds to a refractive index of a medium (e.g., air, skin, and the like) which contacts the upper surface of the transparent cover member 102. Accordingly, an amount of light Light_12 which reflects toward the inside the panel may vary depending on a touch of a finger, or ridges of a fingerprint.

Specifically, prints of a finger 20 consist of ridges which have specific patterns. Accordingly, ridge parts 21 of a finger 20 contact the upper surface of the transparent cover member 102, but spaced parts 22 between the ridges do not contact the transparent cover member 102, in the state in which the finger 20 contacts the upper surface of the transparent cover member 102. That is, the upper surface of the transparent cover member 102 contacts skin in the ridge parts 21, but the upper surface of the transparent cover member 102 contacts air in the spaced parts 22 between the ridges.

In this case, the skin 20 has a different refractive index from air. Accordingly, an amount of light Light_2 which reflects in an area of the upper surface of the transparent cover member 102, which contacts the ridge parts 21, is different from an amount of light Light_3 which reflects in an area of the upper surface of the transparent cover member 102, which contacts the spaced parts 22 between the ridges. Further, most of the light passes through the skin or is absorbed into the skin in the area which contacts the ridge parts 21, and a portion of the rest of the light may reflect. Thus, the ridge parts 21 of the finger print 20 and the spaced parts 22 between the ridges may be drawn on the basis of a difference in amounts of light (Light_2, and Light_3) which is input to the light-receiving device PD.

As illustrated in FIG. 5, a thin-film transistor array 110 of an image-displaying unit 100 includes a driving transistor DT which is connected to an electro-luminescence device ELD corresponding to each display pixel area DP.

For instance, the driving transistor DT may have a top gate structure. That is, the driving transistor DT includes an active layer ACT which is disposed above a first substrate 101, a gate insulating film 111 which is disposed above a portion of the active layer ACT, a gate electrode GE which is disposed above the gate insulating film 111, and a source electrode SE and a drain electrode DE which are disposed above an interlayer insulating film 112 covering the active layer ACT and the gate electrode GE.

The gate electrode GE connects to a switching transistor (ST in FIG. 2) and a storage capacitor (Cst in FIG. 2) through a first node (n1 in FIG. 2).

The active layer ACT includes a channel area which is overlapped with the gate electrode GE, and a source area and a drain area which are disposed on both sides of the channel area. The active layer ACT may include an oxide semiconductor material or a silicon semiconductor material.

The source electrode SE connects to the source area of the active layer ACT through a contact hole which penetrates the interlayer insulating film 112.

Like the source electrode SE, the drain electrode DE connects to the drain area of the active layer ACT through a contact hole which penetrates the interlayer insulating film 112.

Any one (source electrode SE in FIG. 5) of the source electrode SE and the drain electrode DE of the driving transistor DT is connected to a first driving power supply line (EVDD in FIG. 2), and the other (drain electrode DE in FIG. 5) is connected to the electro-luminescence device ELD.

The source electrode SE and the drain electrode DE of the driving transistor DT are covered with a buffer film 113.

The electro-luminescence device ELD of the image-displaying unit 100 includes a display anode electrode 121 which is disposed above the buffer film 113 of the thin-film transistor array 110, a display cathode electrode 122 which faces the display anode electrode 121, and an electro-luminescence layer 123 which is disposed between the display anode electrode 121 and the display cathode electrode 122.

The display anode electrode 121 corresponds to each display pixel area DP. The display anode electrode 121 is connected to the driving transistor DT corresponding to each display pixel area DP through the contact hole which penetrates the buffer film 113.

An edge of the display anode electrode 121 is covered with a bank 103 which is disposed above the buffer film 113 of the thin-film transistor array 110.

The bank 103 may include an insulation material to prevent carriers from being clustered at the edge of the display anode electrode 121. Additionally, the bank 103 may include a transparent material to prevent light which is reflected on an upper surface of a transparent cover member 102 and which proceeds toward a light-sensing unit 200 from being lost by the bank 103.

The electro-luminescence layer 123 of the electro-luminescence device ELD corresponds to each display pixel area DP and includes an electro-luminescence material. The electro-luminescence material may be an organic material, or an inorganic material. When a diode is made of an organic material, the diode may be referred to as an organic light-emitting diode (OLED). When a diode is made of an inorganic material, the diode may be referred to as a quantum-dot light-emitting diode (QLED). However, the electro-luminescence material is not limited to what has been described.

The electro-luminescence layer 123 may have a structure in which a hole transport layer (HTL), an emitting Layer (EML) and an electron transport Layer (ETL) are consecutively stacked. The electro-luminescence layer 123 may have a single-stack light-emitting structure or a multi-stack light-emitting structure.

The hole transport layer (HTL) is disposed near the display anode electrode 121, and the electron transport Layer (ETL) is disposed near the display cathode electrode 122. Additionally, the electro-luminescence layer 123 may further include a hole injection layer (HIL) which is disposed between the hole transport layer (HTL) and the display anode electrode 121, or an electron injection layer (EIL) which is disposed between the electron transport layer (ETL) and the display cathode electrode 122. However, the structure of the display apparatus according to an aspect is not limited to what has been described.

The electro-luminescence layer 123 may include a dopant or a host of a color corresponding to each display pixel area DP. Accordingly, the electro-luminescence layer 123 may emit light of a specific color. When a display panel 11 includes an additional color filter, the electro-luminescence layer 123 may emit white light.

The display cathode electrode 122 may correspond to the plurality of display pixel areas DP which are adjacent to each other, and may be disposed to cover the bank 103 and the electro-luminescence layer 123.

An electro-luminescence unit 120 may denote a configuration in which electro-luminescence devices ELD including a display anode electrode 121, an electro-luminescence layer 123, and a display cathode electrode 122 are arranged in a matrix form.

The image-displaying unit 100 may further include an organic device protective film 104 which is disposed above the thin-film transistor array 110, which covers a plurality of electro-luminescence devices ELD, and which has a flat shape. In this case, the transparent cover member 102 may be disposed above the organic device protective film 104.

The organic device protective film 104 may have a curved surface shape which corresponds to the curvature of the pattern of a lower end thereof, or may have a flat shape. Additionally, the organic device protective film 104 may include an encapsulation layer which prevents oxygen and/ or moisture from infiltrating the plurality of electro-luminescence devices ELD.

Each light-receiving device PD of the light-sensing unit 200 includes a sensing anode electrode 211 which is disposed above a second substrate 201, a sensing cathode electrode 212 which faces the sensing anode electrode 211, and a PIN junction layer 213 which is disposed between the sensing anode electrode 211 and the sensing cathode electrode 212.

The sensing anode electrode 211 may be connected to a readout line (ROL in FIG. 1), and the sensing cathode electrode 212 may be connected to bias power supply (Vbias in FIG. 3) (invisible).

At least one of the readout line ROL and the bias power supply line may be disposed above the second substrate 201.

A plurality of light-receiving devices PD are covered with a transparent film 202 which is disposed above the second substrate 201.

The transparent film 202 may have a shape which corresponds to curvature of a pattern of the lower end thereof or may have a flat shape.

The transparent film 202 may include a transparent material to reduce loss of light which is input to the light-receiving device PD. Additionally, the transparent film 202 may include a transparent insulation material to reduce electric interference between devices.

A light shielding film 203 is disposed above the transparent film 202. The light shielding film 203 may include a light-absorbing material. The light shielding film 203 may minimize reckless input of noise light unnecessary for sensing a touch and/or a fingerprint to the plurality of light-receiving devices PD.

A plurality of opening patterns OP corresponds to the plurality of light-receiving devices PD and penetrates the light shielding film 203. That is, each of the opening patterns OP may be formed through a patterning process of removing a portion of the light shielding film 203.

As an example, when seen from above, each opening pattern OP may be disposed in an area of the light shielding film, which is not overlapped with each light-receiving device PD, and a width of each opening pattern OP may correspond to a width of each light-receiving device PD.

The light shielding film 203 and the opening pattern OP allows only light which passes through each opening pattern OP corresponding to each light-receiving device PD to be input to each light-receiving device PD. That is, the opening pattern OP is slit with respect to the light which is input to each light-receiving device PD. Accordingly, each light-receiving device PD absorbs at least portion of light which is generated in an effective light-receiving area (ARA) which is a portion of an upper surface of the transparent cover member 102, which corresponds to the opening pattern OP. The light which is generated in the effective light-receiving area ARA, or the light of the effective light-receiving area ARA refers to light which is transmitted, scattered, or reflected toward the light-receiving device PD in the effective light-receiving area ARA of the upper surface of the transparent cover member 102.

A collection of points at which extension lines which connect an edge of each opening pattern OP and an edge of each light-receiving device PD meet the upper surface of the transparent cover member 102 draws a closed curve. In this case, an inner area of a closed curve with a largest possible surface area is referred to as the effective light-receiving area ARA. The effective light-receiving area ARA may correspond to a gap G1 between the transparent cover member 102 and the opening pattern OP, a gap G2 between the opening pattern OP and the light-receiving device PD, a width W_OP of the opening pattern OP, and a width W_PD of the light-receiving device PD.

Accordingly, the effective light-receiving area ARA may have a proper size and shape in response to a size and shape of a pattern subject to sensing. For instance, the effective light-receiving area ARA for sensing a fingerprint and a touch may have a proper size and shape on the basis of a distance and size of each pattern subject to sensing.

For instance, a width of the effective light-receiving area ARA may be less than a gap between ridges of a fingerprint to implement the function of sensing a user's fingerprint. As an example, a width of the effective light-receiving area ARA may be 200 μm or less considering a width of the ridge of a fingerprint. A width of the effective light-receiving area ARA may be 150 μm or less.

For instance, the effective light-receiving area ARA may be configured to have a width corresponding to resolution of an image subject to scanning to function as an image scanner. For instance, a width of the effective light-receiving area ARA may be 50 μm or less based on resolution of an image.

That is, the structure of the effective light-receiving area ARA of the display panel 11 may be determined on the basis of an application which will be applied to the display panel 11, among applications such as a scanner, a fingerprint sensor and the like.

Accordingly, a width of the effective light-receiving area ARA of the display panel 11 may be determined based on a target of sensing of the display panel 11 such as an image, a fingerprint, and the like.

As described above, each light-receiving device PD is matched with the effective light-receiving area ARA corresponding to each opening pattern OP. That is, an area in which light sensed in each light-receiving device PD is generated is limited to the effective light-receiving area ARA. Accordingly, noise light which is input to each light-receiving device may be reduced, thereby improving a signal-to-noise ratio.

According to the first aspect, each opening pattern OP may be horizontally spaced apart from each light-receiving device PD. In this case, each light-receiving device PD is overlapped with the light shielding film 203.

Among the lines which connect the edge of each opening pattern OP and the edge of each light-receiving device PD, a line which forms a minimum angle together with a normal line of the upper surface of the transparent cover member 102 is referred to as an opening-pattern available minimum incidence path D_OP. An angle $\theta_{OP}$ (hereinafter referred to as "opening-pattern minimum available incidence angle") which is formed by the opening-pattern available minimum incidence path D_OP and the normal line of the upper surface of the transparent cover member 102 is greater than a predetermined critical angle. The predetermined critical angle is determined by the transparent cover member 102, and a medium (e.g., air) which contacts the upper surface of the transparent cover member 102. A critical angle with respect to the opening-pattern minimum available incidence angle $\theta_{OP}$ may be determined on the basis of a range of incidence angles which are selected as noise light or a range of incidence angles which is selected as signal light.

As an example, a critical angle with respect to the opening-pattern minimum available incidence angle $\theta_{OP}$ may be set to a critical angle of total internal reflection ($\theta_{TIR}$) on the upper surface of the transparent cover member 102, which contacts air. In this case, signal light which is input to the light-receiving device PD may be limited to light which is totally reflected on the upper surface of the transparent cover member 102. Thus, a signal-to-noise ratio may improve.

That is, light Light_4 which corresponds to the effective light-receiving area ARA of the upper surface of the transparent cover member 102 and which passes through each opening pattern OP may be optionally input to each light-receiving device PD. The light shielding film 203 may prevent light Light_5 outside the effective light-receiving area ARA from being input to the light-receiving device PD. Accordingly, a rate of signal light supplied to each light-receiving device PD may increase, thereby improving a signal-to-noise ratio.

In other words, a range of angles of light which reaches the light-receiving device PD is determined on the basis of a geometric shape of the opening pattern OP, a geometric shape of the light-receiving device PD, and a relative location of the two shapes. In this case, among angles which are formed by the line which connects the edge of the opening pattern OP and the edge of the light-receiving device PD, and the normal line of the upper surface of the transparent cover member 102, a minimum angle and a maximum angle are respectively defined as an "opening-pattern minimum available incidence angle $\theta_{OP}$" and an "opening-pattern available maximum incidence angle". A collection of points at which extension lines which connect the edge of the opening pattern OP and the edge of the light-receiving device PD meet the upper surface of the transparent cover member 102 draws a closed curve. In this case, an area inside a closed curve with a largest possible surface area is defined as the effective light-receiving area ARA.

As an example, when a portion of inner light which proceeds at an angle greater than a critical angle is used as signal light, the opening-pattern minimum available incidence angle $\theta_{OP}$ may be set to an angle the same as or greater than the critical angle. With this structure, the light shielding film 203 shields "external light which proceeds at an angle less than or equal to a critical angle", and "light which does not contribute to sensing, among inner light which proceeds at an angle greater than or equal to a critical angle", thereby minimizing the possibility which the external light and the light which does not contribute to sensing reach the light-receiving device PD. On the other hand, light which contributes to sensing, among light which proceeds at an angle greater than or equal to a critical angle, is allowed to reach the light-receiving device PD through the opening pattern OP, thereby improving a signal-to-noise ratio.

As another example, when necessary, an arrangement of each opening pattern OP with respect to each light-receiving device PD may be determined such that a critical angle is between the "opening-pattern minimum available incidence angle" and the "opening-pattern available maximum incidence angle". When light which is emitted from any luminescence device reaches any light-receiving device PD, an amount of the light which reaches the light-receiving device PD is maximized at an incidence angle of the light near a critical angle. Accordingly, with a properly set structure, an amount of light which is input to the light-receiving device may be maximized.

As yet another example, when a portion of inner light which proceeds at an angle less than a critical angle is used signal light, the opening-pattern available maximum incidence angle may be set to an angle less than the critical angle. With this structure, a ratio of inner light which proceeds at an angle less than a critical angle to inner light which proceeds at an angle greater than or equal to a critical angle may increase.

Another aspect of the present disclosure is described with reference to FIGS. 6 to 10.

Figure 6:
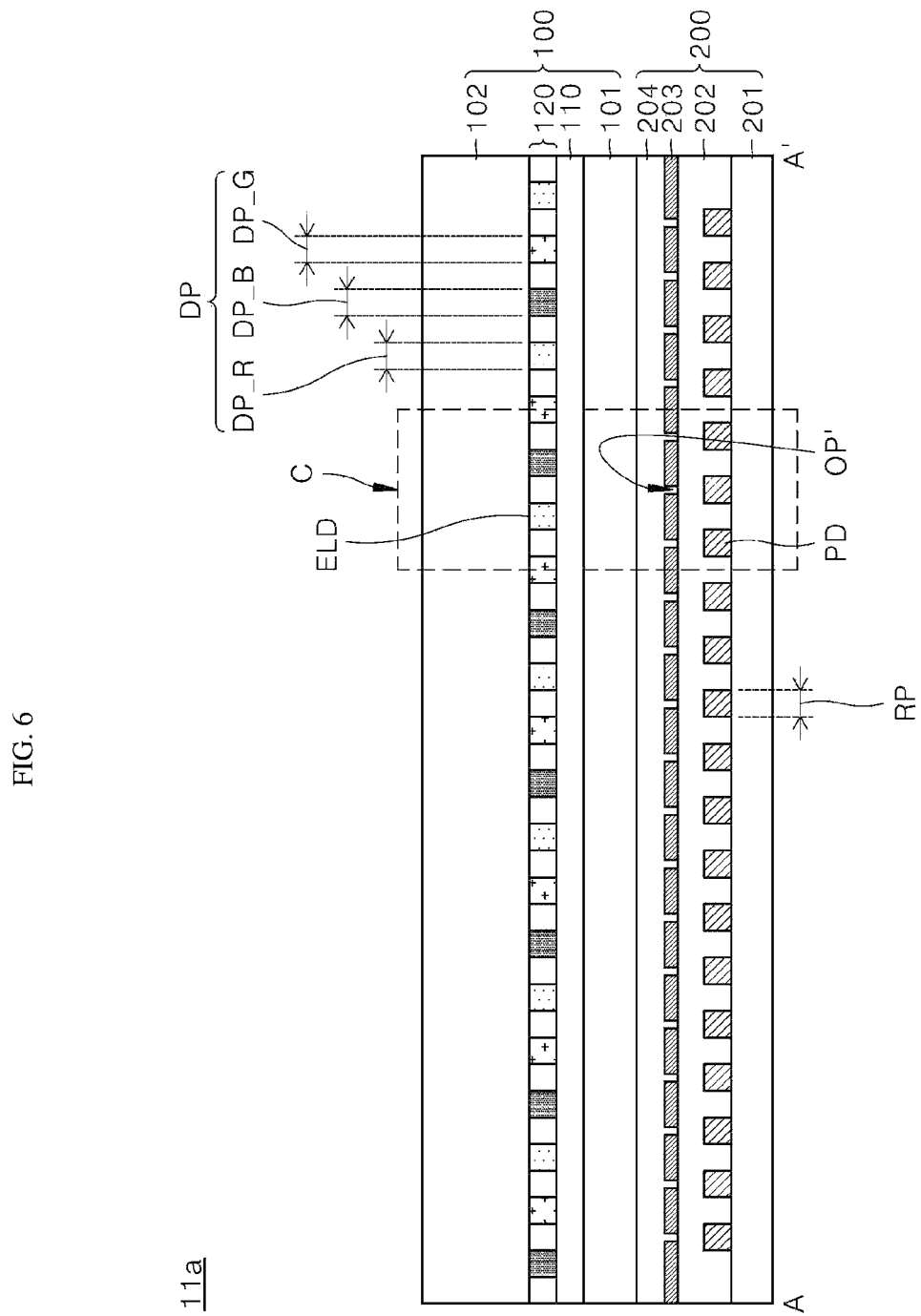
FIG. 6 is a cross-sectional view illustrating a display panel, which corresponds to area A-A' in FIG. 1 according to a second aspect of the present disclosure.
Figure 7:
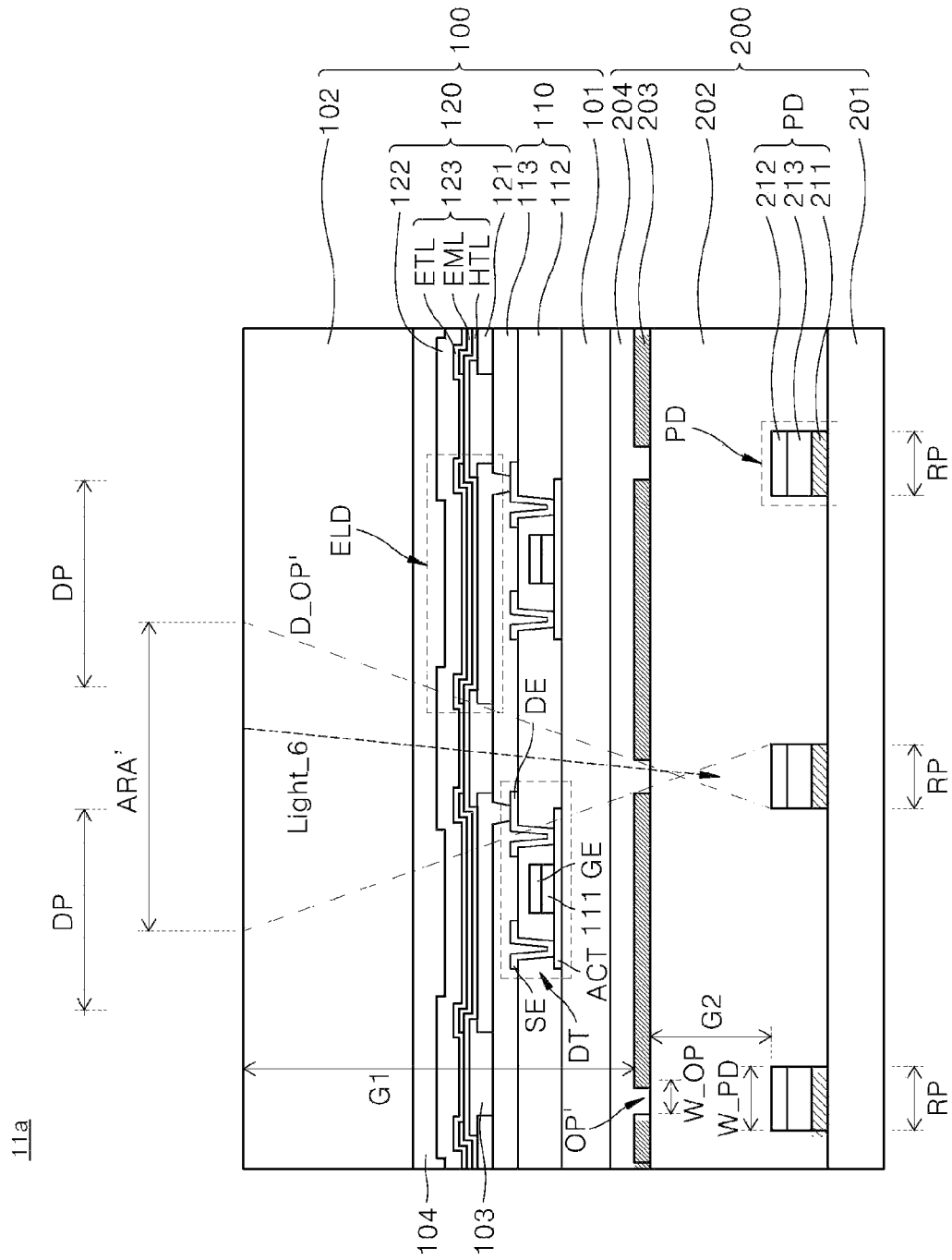
FIG. 7 is a view illustrating area C in FIG. 6.

FIG. 6 is a cross-sectional view illustrating a display panel according to a second aspect, which corresponds to area A-A' in FIG. 1, and FIG. 7 is a view illustrating area C in FIG. 6.

Referring to FIG. 6, a display panel 11a of the display apparatus according to the second aspect is the same as the display panel according to the first aspect illustrated in FIGS. 1 to 5, except which the display panel 11a includes an opening pattern OP' which is overlapped with at least portion of each light-receiving device PD. Accordingly, repetition of description is omitted.

The opening pattern OP' may be overlapped with at least portion of each light-receiving device PD. Specifically, a central point of the opening pattern OP' may be overlapped with a central point of a light-receiving surface of each light-receiving device PD, onto which light is input. That is, at least portion of each light-receiving device PD, each opening pattern OP' and an effective light-receiving area ARA' may be perpendicularly overlapped with one another.

In this case, light Light_6 which is input to each light-receiving device PD may be light which is emitted from a plurality of electro-luminescence devices ELD and the like and which is reflected or scattered in an effective light-receiving area ARA' of an upper surface of a transparent cover member 102, or may be light which is input from the outside of the panel through the effective light-receiving area ARA' of the upper surface of the transparent cover member 102, as illustrated in FIG. 7.

Figure 8:
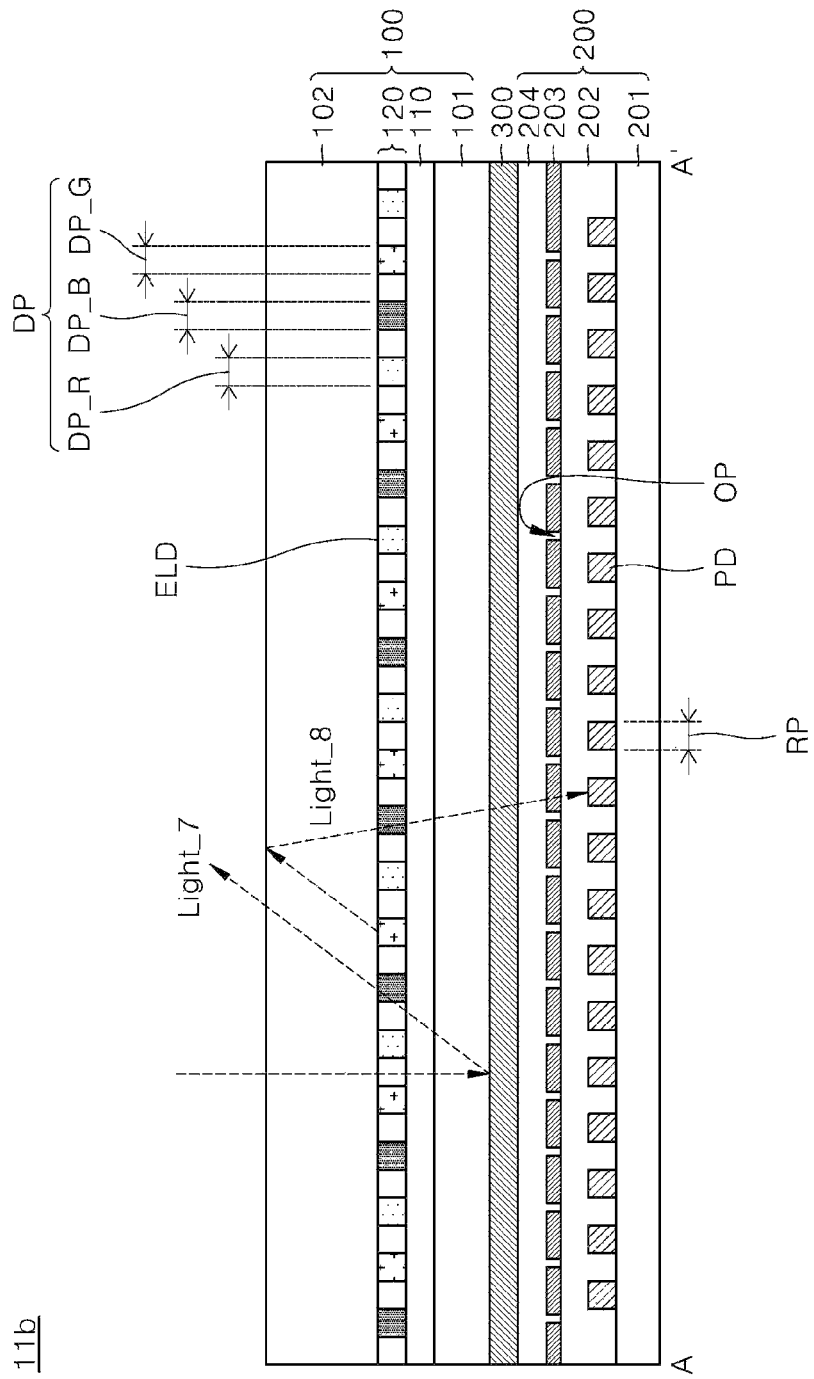
FIG. 8 is a cross-sectional view illustrating a display panel, which corresponds to area A-A' in FIG. 1 according to a third aspect of the present disclosure.

FIG. 8 is a cross-sectional view illustrating a display panel according to a third aspect, which corresponds to area A-A' in FIG. 1.

As illustrated in FIG. 8, a display panel 11b of the display apparatus according to the third aspect is the same as the display panel according to the first and second aspects, except which the display panel 11b further includes a wavelength selective transmission film 300 disposed between an image-displaying unit 100 and a light-sensing unit 200. Accordingly, repetition of description is omitted.

The wavelength selective transmission film 300 transmits a range of wavelengths of signal light which is required for sensing a touch and/or a fingerprint among light from a transparent cover member 102 toward each light-receiving device PD, and reflects or absorbs noise light which is unnecessary for sensing a touch and/or a fingerprint. For instance, the wavelength selective transmission film 300 reflects light Light_7 in a range of infrared rays and transmits light Light_8 in a range of visible light.

The wavelength selective transmission film 300 may be implemented as a distributed Bragg reflector (DBR).

As described above, noise light Light_7, (e.g., light which is input from the outside in a range of infrared rays) may be blocked from being absorbed into each light-receiving device PD by further including the wavelength selective transmission film 300 which reflects light Light_7 in a range of infrared rays. Thus, an error in sensing by the light-receiving device PD may be further prevented.

According to the first, second and third aspects, the plurality of electro-luminescence devices ELD corresponding to the plurality of display pixel areas DP emits light of brightness corresponding to a predetermined image signal. Additionally, light which is generated in the effective light-receiving area(ARA, ARA') of the upper surface of the transparent cover member 102, which corresponds to each opening pattern (OP, OP') is input to each light-receiving device PD.

Accordingly, an amount of light from at least one of the plurality of electro-luminescence devices ELD may be too small for the light-receiving device PD to sense the light. Additionally, light of the electro-luminescence device ELD is required to reach the upper surface of the transparent cover member 102 at an incidence angle less than a critical angle corresponding to total internal reflection because the plurality of electro-luminescence devices ELD for displaying an image is required to emit light out of the transparent cover member 102.

Accordingly, a display apparatus according to a fourth aspect is provided which further includes an additional light source for sensing a touch or a fingerprint in addition to a plurality of electro-luminescence devices ELD for displaying an image.

Figure 9:
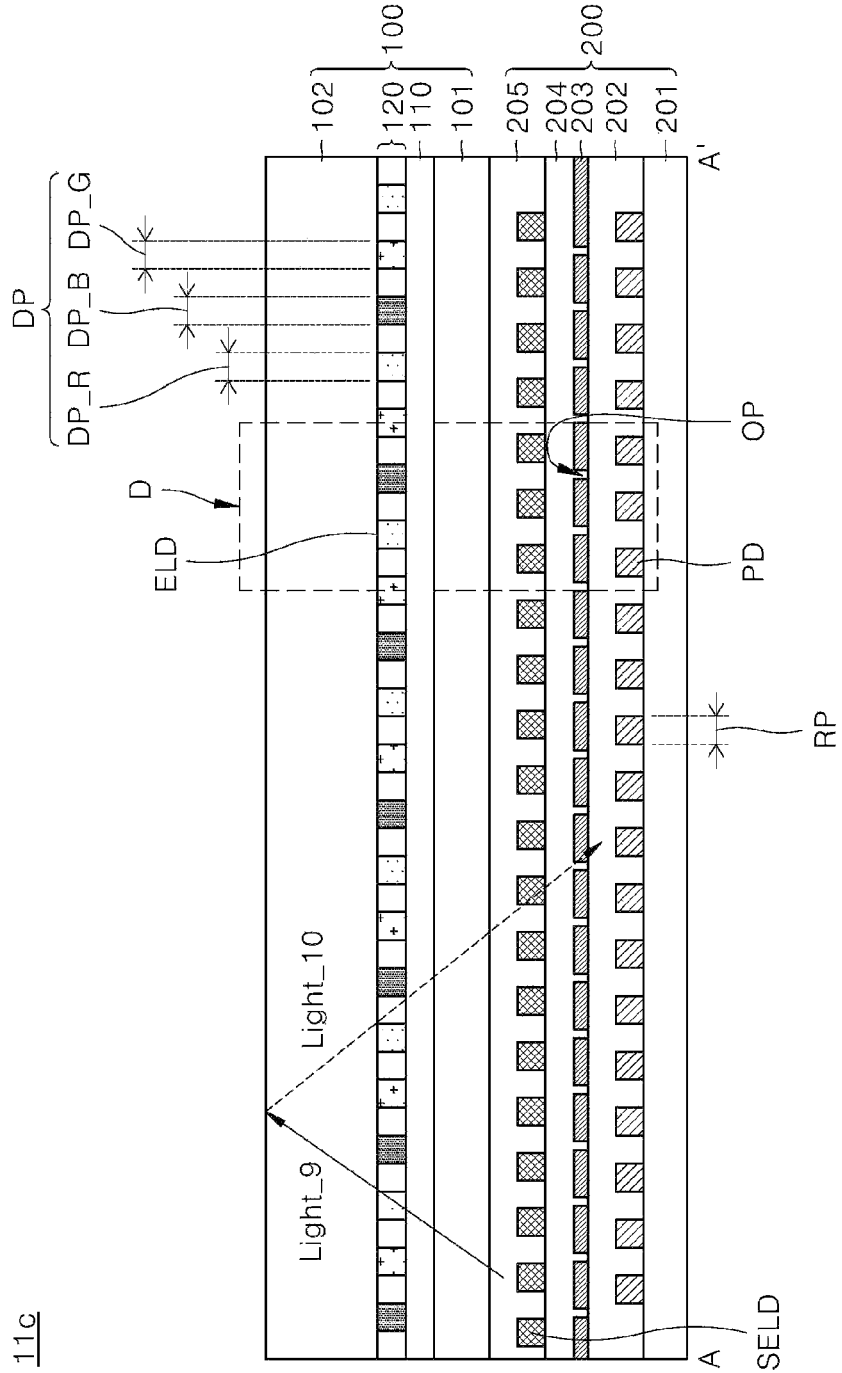
FIG. 9 is a cross-sectional view illustrating a display panel, which corresponds to area A-A' in FIG. 1 according to a fourth aspect of the present disclosure.
Figure 10:
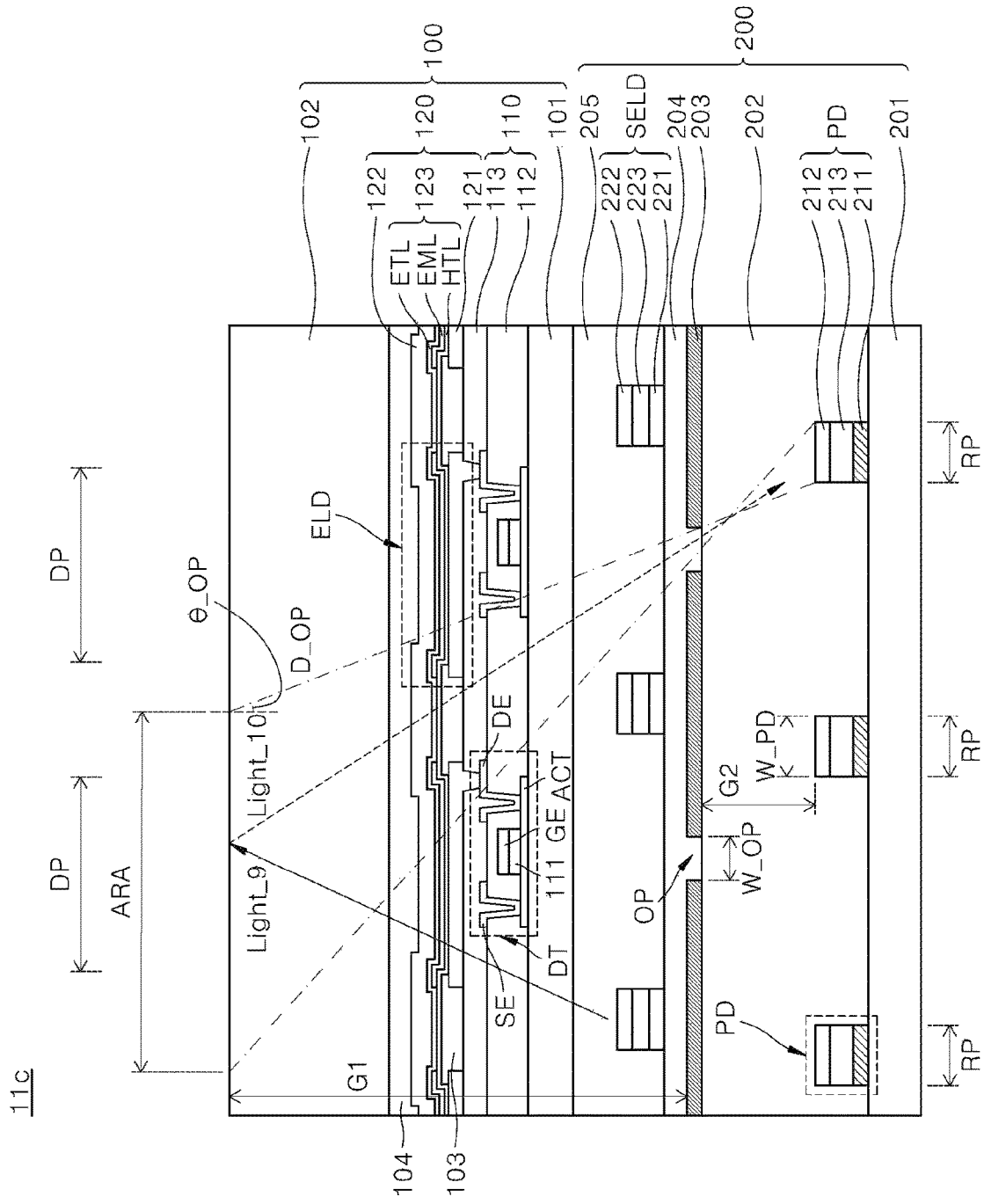
FIG. 10 is a view illustrating area D in FIG. 9.

FIG. 9 is a view illustrating an example of a cross section of a display panel according to a fourth aspect, which corresponds to area A-A' in FIG. 1, and FIG. 10 is a view illustrating area D in FIG. 9.

As illustrated in FIG. 9, a display panel 11c of the display apparatus according to the fourth aspect is the same as the display panel according to the first, second and third aspects, except which the display panel 11c further includes at least one supplementary electro-luminescence device SELD which' is disposed above a light shielding film 203. Accordingly, repetition of description is omitted.

At least one supplementary electro-luminescence device SELD may be disposed above a pattern protective film 204 which covers the light shielding film 203, or may be disposed directly on the light shielding film 203.

The supplementary electro-luminescence device SELD may be covered with a supplementary electro-luminescence device protective film 205.

Additionally, each supplementary electro-luminescence device SELD is overlapped with the light shielding film 203. By doing so, light Light_9 of the supplementary electro-luminescence device SELD may be prevented from being directly input to each light-receiving device PD through an opening pattern OP. That is, at least portion Light_10 of light Light_9 which is emitted from at least one supplementary electro-luminescence device SELD and which is reflected on an upper surface of a transparent cover member 102 is input to each light-receiving device PD through each opening pattern OP.

As illustrated in FIG. 10, each supplementary electro-luminescence device SELD includes a supplementary anode electrode 221, a supplementary cathode electrode 222 which faces the supplementary anode electrode 221, and a supplementary electro-luminescence layer 223 which is disposed between the supplementary anode electrode 221 and the supplementary cathode electrode 222.

The supplementary electro-luminescence layer 223 emits light based on driving current which is supplied between the supplementary anode electrode 221 and the supplementary cathode electrode 222.

Like the electro-luminescence layer 123 of the electro-luminescence device ELD, the supplementary electro-luminescence layer 223 may have a structure in which a hole transport layer HTL, an emitting Layer EML and an electron transport Layer ETL are stacked. Additionally, the supplementary electro-luminescence layer 223 may have a single-stack light-emitting structure or a multi-stack light-emitting structure.

As described above, an amount of light which is input to the transparent cover member 102 may be increased by further including at least one supplementary electro-luminescence device SELD.

By doing so, an amount of light which is input to the light-receiving device PD may be maintained to a certain level or above, regardless of brightness of the electro-luminescence device ELD. Thus, an amount of signal light may be increased, thereby improving a signal-to-noise ratio.

Figure 11:
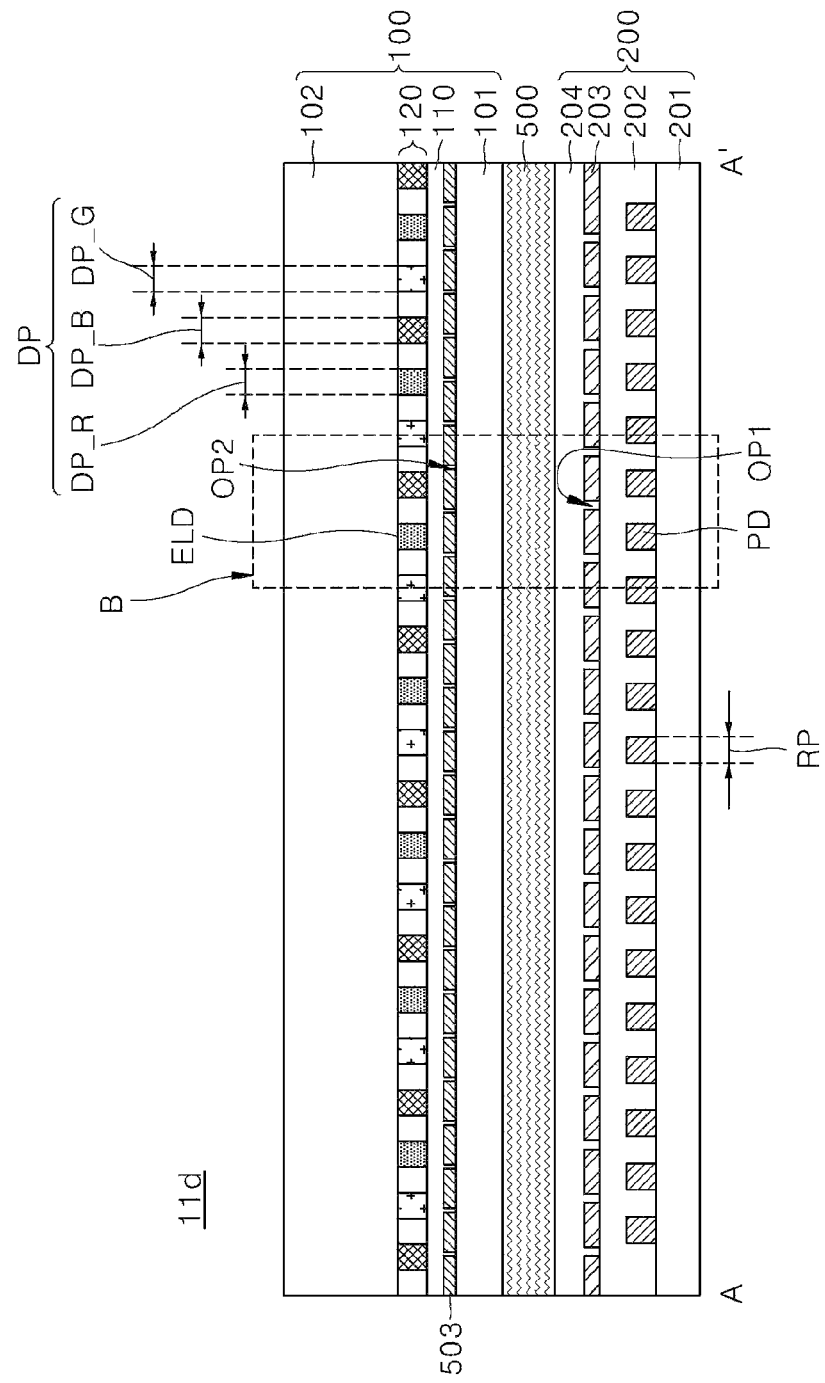
FIG. 11 is a cross-sectional view illustrating a display panel, which corresponds to area A-A' in FIG. 1 according to a fifth aspect of the present disclosure.

FIG. 11 is a view illustrating an example of a cross section of a display panel according to a fifth aspect, which corresponds to area A-A' in FIG. 1, and FIGS. 12A to 12H are views illustrating area B in FIG. 11.

As illustrated in FIG. 11, unlike the display panel 11 of the display apparatus according to the first aspect, a display panel 11d of the display apparatus according to the fifth aspect further includes a second light shielding film 503 which is additionally disposed in an image-displaying unit 100, and a second opening pattern (OP2) which is patterned in the second light shielding film 503. Additionally, repetition of unnecessary description may be avoided for convenience of description.

Hereunder, the light shielding film 203 in the above-described aspects may be referred to as a first light shielding film 203, and the opening pattern OP in the above-described aspects may be referred to as a first opening pattern OP1, for convenience of description.

The image-displaying unit 100 of the display panel 11d may be formed directly on a light-sensing unit 200. That is, elements of the light-sensing unit 200 are all deposited, and then the image-displaying unit 100 may be directly deposited on the light-sensing unit 200, without a transparent adhesive layer 500. According to the above-described configuration, an alignment tolerance of the image-displaying unit 100 and the light-sensing unit 200 may be minimized.

However, the display panel according to the fifth aspect is not limited to what has been described. The image-displaying unit 100 and the light-sensing unit 200 may be attached with the transparent adhesive layer 500. In this case, the image-displaying unit 100 and the light-sensing unit 200 may be separately manufactured, thereby improving convenience in production.

A transistor array 110 of the display panel 11d may further include a second light shielding film 503. For convenience of description, repetition of description of the elements of the above-described transistor array 110 is omitted.

The second light shielding film 503 may be disposed between a thin-film transistor array 110 and a first substrate 101. However, the second light shielding film 503 is not limited to what has been described. The second light shielding film 503 may also be disposed between an electro-luminescence unit 120 and the thin-film transistor array 110. However, the second light shielding film 503 is not limited to what has been described. The second light shielding film 503 may consist of a portion of a metallic layer which constitutes the thin-film transistor array 110. However, the second light shielding film 503 is not limited to what has been described. The second light shielding film 503 may consist of a portion of a bank 103 which includes a light-absorbing material. That is, the second light shielding film 503 may include a light shielding material or a light-absorbing material which is disposed around the thin-film transistor array 110.

The second opening pattern OP2 may be formed by patterning a portion of the second light shielding film 503. Each second opening pattern OP2 may be designed to correspond to each first opening pattern OP1. Additionally, each first opening pattern OP1 may be designed to correspond to each light-receiving device PD.

Figure 12A:
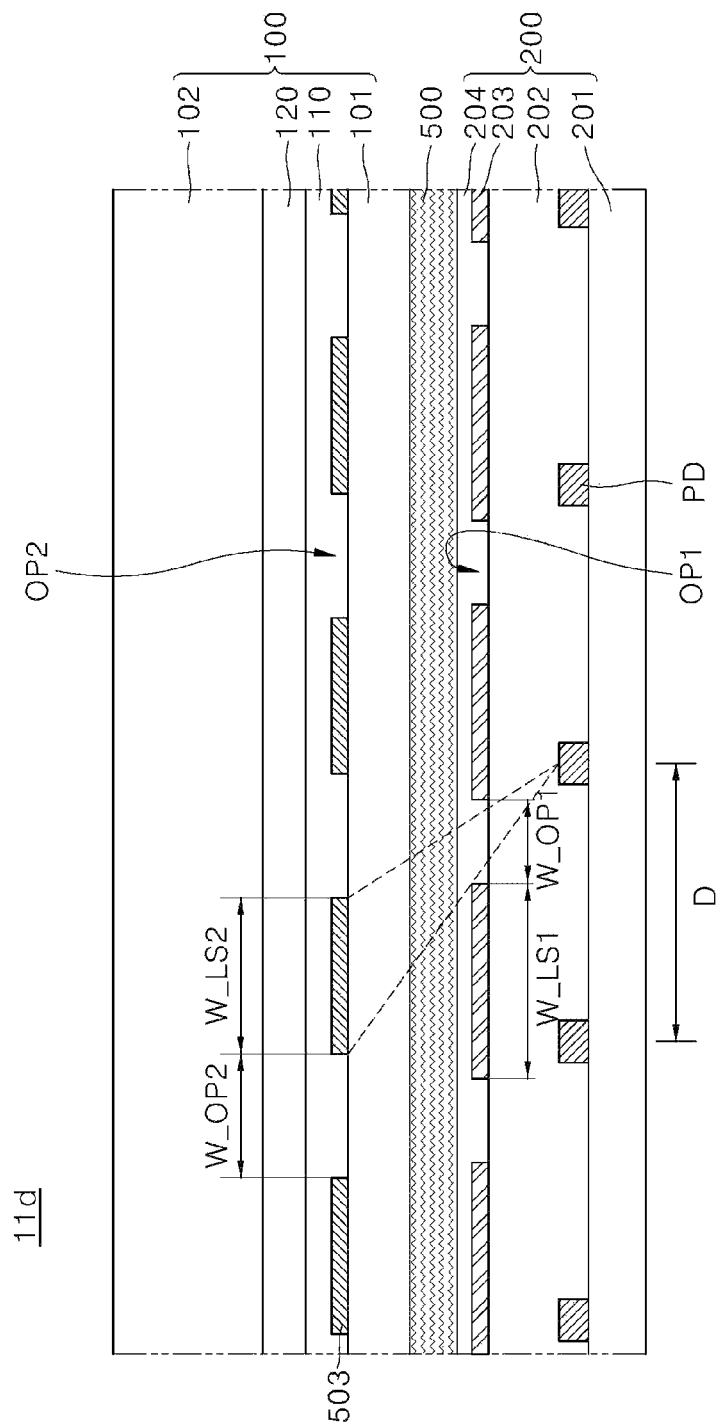

Functions of the first light shielding film 203, the second light shielding film 503, the first opening pattern OP1, and the second opening pattern OP2 are described specifically, with reference to FIG. 12A.

As described above, a plurality of electro-luminescence devices ELD which are arranged in a matrix form in the electro-luminescence unit 120 emit light to supply a light source for sensing a fingerprint. The light source supplied from the electro-luminescence unit 120 has properties as a surface light source. Accordingly, light reflected from a fingerprint does not have a specific direction and is scattered.

The second light shielding film 503 is disposed above the first light shielding film 203, and a single first opening pattern OP1 which is formed in the first light shielding film 203 corresponds to a single second opening pattern OP2 which is formed in the second light shielding film 503. Accordingly, unlike a display panel with a single light shielding film 203, a display panel with two light shielding films may increase a signal-to-noise ratio.

The first opening pattern OP1 may have a circular shape, a polygonal shape or a specific shape. The second opening pattern OP2 may have a shape which corresponds to the shape of the first opening pattern OP1.

A plurality of light-receiving devices PD may be spaced apart at specific intervals. The plurality of light-receiving devices PD may be arranged in a matrix form. The first opening patterns OP1 may be arranged such that a gap between the first opening patterns OP1 corresponds to a distance D between the light-receiving devices PD. The second opening patterns OP2 may be arranged such that a gap between the second opening patterns OP2 corresponds to the distance D between the light-receiving devices PD. The distance D may be measured with respect to the center of the light-receiving device PD.

The distance D between the light-receiving devices PD may be the same as a total of a width of a first light shielding area W_LS1 and a width of the first opening pattern W_OP1. Additionally, the distance D between the light-receiving devices PD may be the same as a total of a width of a second light shielding area W_LS2 and a width of the second opening pattern W_OP2.

Referring back to FIG. 12A, FIG. 12A illustrates an example in which a width of an extension line which connects edges of the light-receiving device PD and the first opening pattern OP1 is the same as the width of the second light shielding area W_LS2. However, the present disclosure is not limited to what has been described.

That is, the width of an extension line may be designed to be at least more than or equal to the width of the first opening pattern W_OP1 as the width of the extension line which connects the center of the light-receiving device PD and the edge of the first opening pattern OP1 is at least less than or equal to a total of the width of the second light shielding area W_LS2 and the width of the second opening pattern W_OP2 at the position of the second light shielding film 503.

Further, the distance D between the light-receiving devices PD with respect to one cross section may be the same as the total of the width of the first light shielding area W_LS1 and the width of the first opening pattern W_OP1, and the total of the width of the second light shielding area W_LS2 and the width of the second opening pattern W_OP2. However, the above-described distance and various widths may be set within a range of a tolerance of 10%.

According to the above-described configuration, a single light-receiving device PD may be configured to receive light which consecutively passes through the second opening pattern OP2 and the first opening pattern OP1 which correspond to the light-receiving device PD. Thus, a signal-to-noise ratio may improve.

FIG. 12B illustrates an example of a display panel 11d in which an image-displaying unit 100 is attached above a light-sensing unit 200 with a transparent adhesive layer 500. The configuration in FIG. 12B is substantially the same as the configuration in FIG. 12A. Accordingly, repetition of description is omitted. Further, some of the repetitive drawing symbols are omitted.

In comparison with FIG. 12A, FIG. 12B illustrates second opening patterns OP2 misaligned in one direction due to predetermined assembly tolerance which happens during a process in which the image-displaying unit 100 and the light-sensing unit 200 are attached.

The display panel 11d according to the fifth aspect may allow a single first opening pattern OP1 and a single second opening pattern OP2 which supply light to a single light-receiving device PD to be arranged such that the single first opening pattern OP1 and single second opening pattern OP2 correspond to each other, even though misalignment occurs. Referring back to FIG. 12B, light which is scattered at a specific point of an upper surface of a transparent cover member 102 is reflected in various directions. For instance, FIG. 12B illustrates scattered light which has five different angles. In FIG. 12B, light which reaches a single light-receiving device PD is expressed as a full line, and light which does not reach a light-receiving device PD and which is blocked by a first light shielding film 203 or a second light shielding film 503 is expressed as a dotted line. Light toward the rest light-receiving devices, except for the second light-receiving device PD from the right, is all blocked by the first light shielding film 203 or the second light shielding film 503.

According to the above-described configuration, the first opening pattern OP1 and the second opening pattern OP2 may make a light path such that unnecessary scattered light may be blocked using the first opening pattern OP1 and the second opening pattern OP2 corresponding to each other, and light which is scattered at a specific point of the transparent cover member 102 corresponds to a specific light-receiving device PD. Accordingly, a signal-to-noise ratio may improve.

Referring to FIGS. 12C to 12H, when predetermined misalignment occurs during a process of adhesion, a display panel 11d may be automatically aligned to receive light which consecutively passes through a second opening pattern OP2 and a first opening pattern OP1 which correspond to each light-receiving device PD. Accordingly, light which is scattered at a specific point of an upper surface of a transparent cover member 102 may pass through the second opening pattern OP2 and the first opening pattern OP1 which correspond to each light-receiving device PD and may be properly matched with each light-receiving device PD. The rest scattered light may be blocked by a first light shielding film 203 and a second light shielding film 503.

That is, FIGS. 12C to 12H illustrate various examples in which positions of a second light shielding film 503 vary.

Figure 12C:
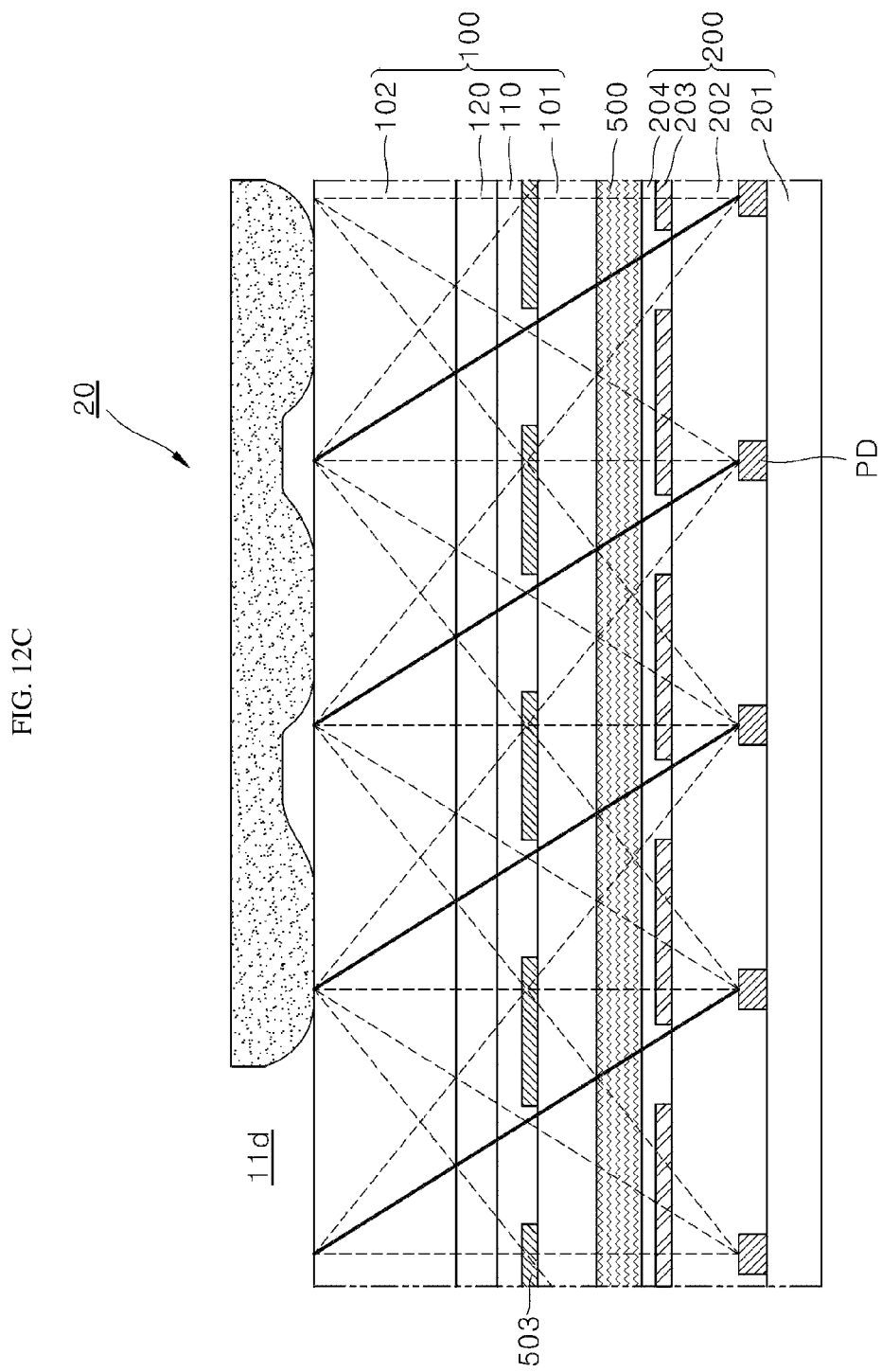
Figure 12D:
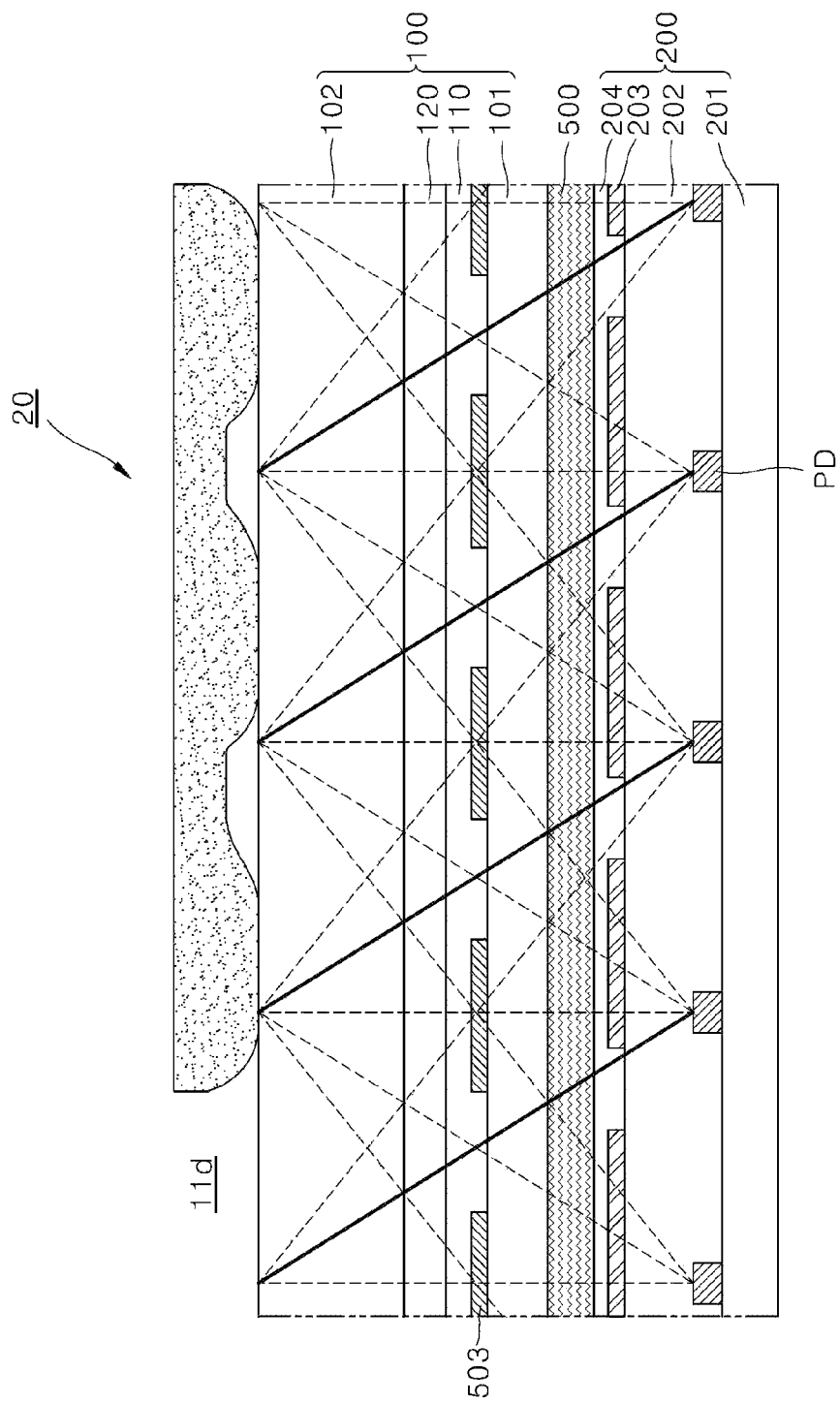
Figure 12E:
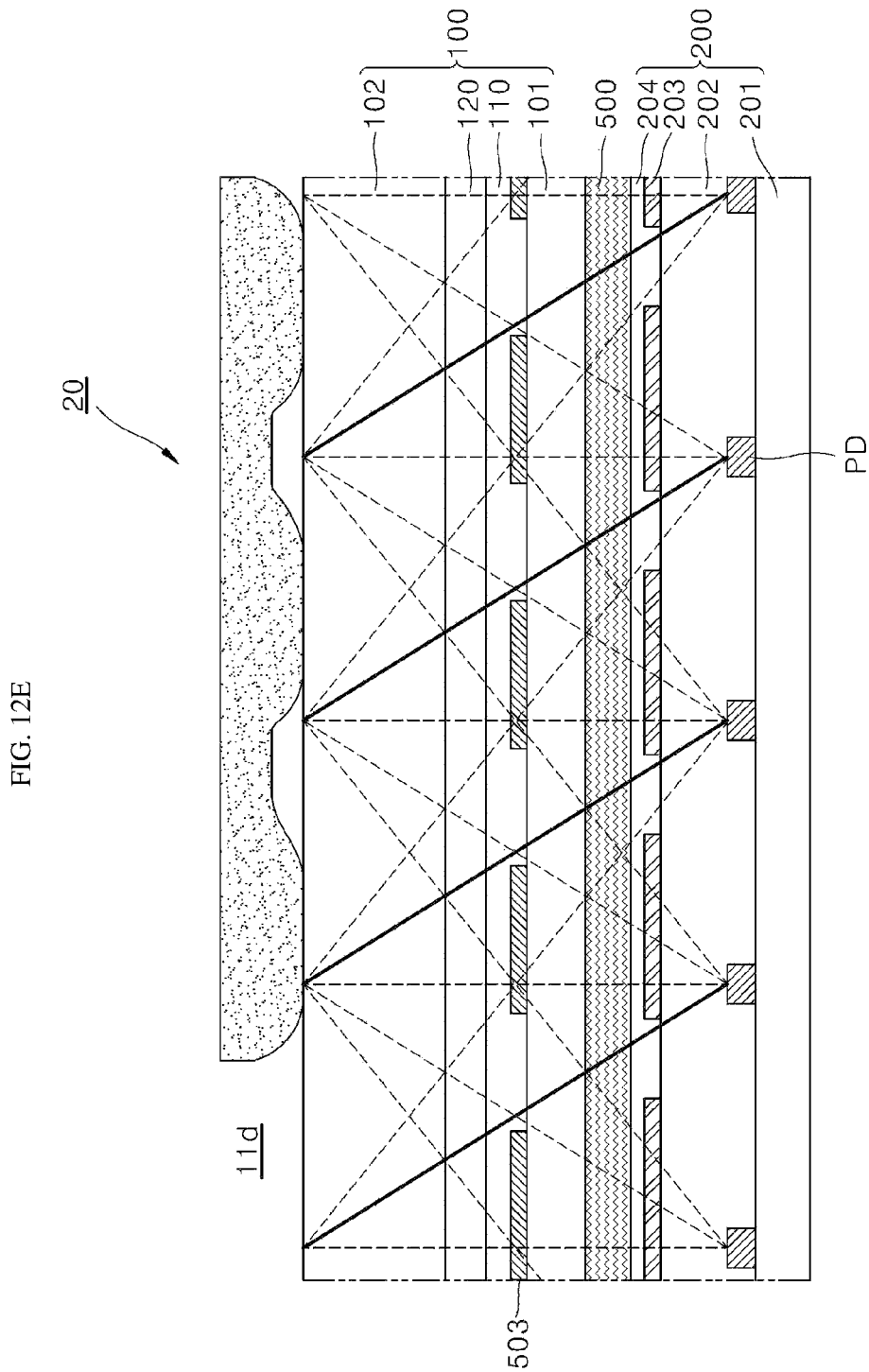

FIGS. 12C to 12E illustrate that a light-receiving device PD matched by the first opening pattern OP1 and the second opening pattern OP2 may be the same even though predetermined adhesion tolerance occurs.

Figure 12F:
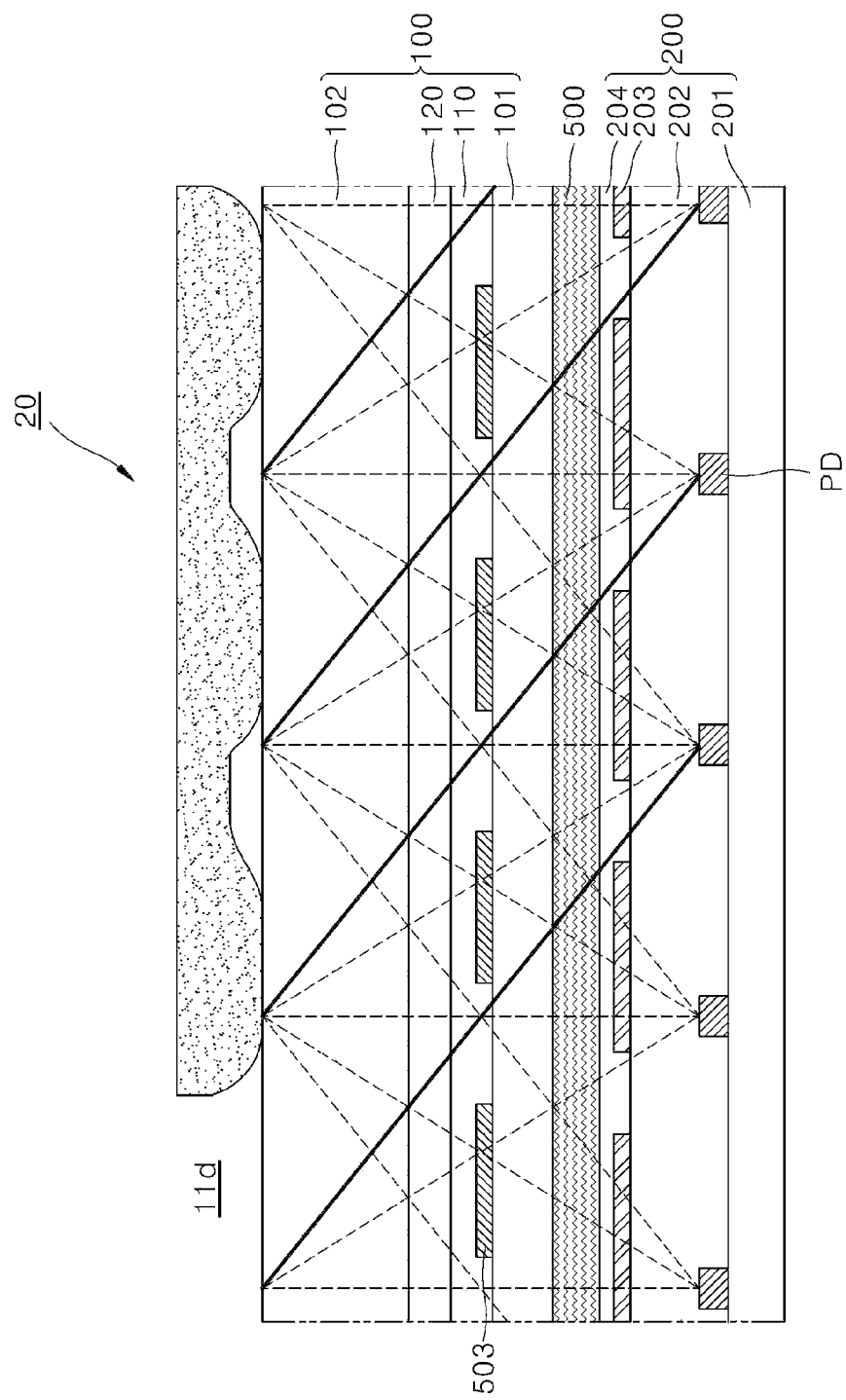
Figure 12H:
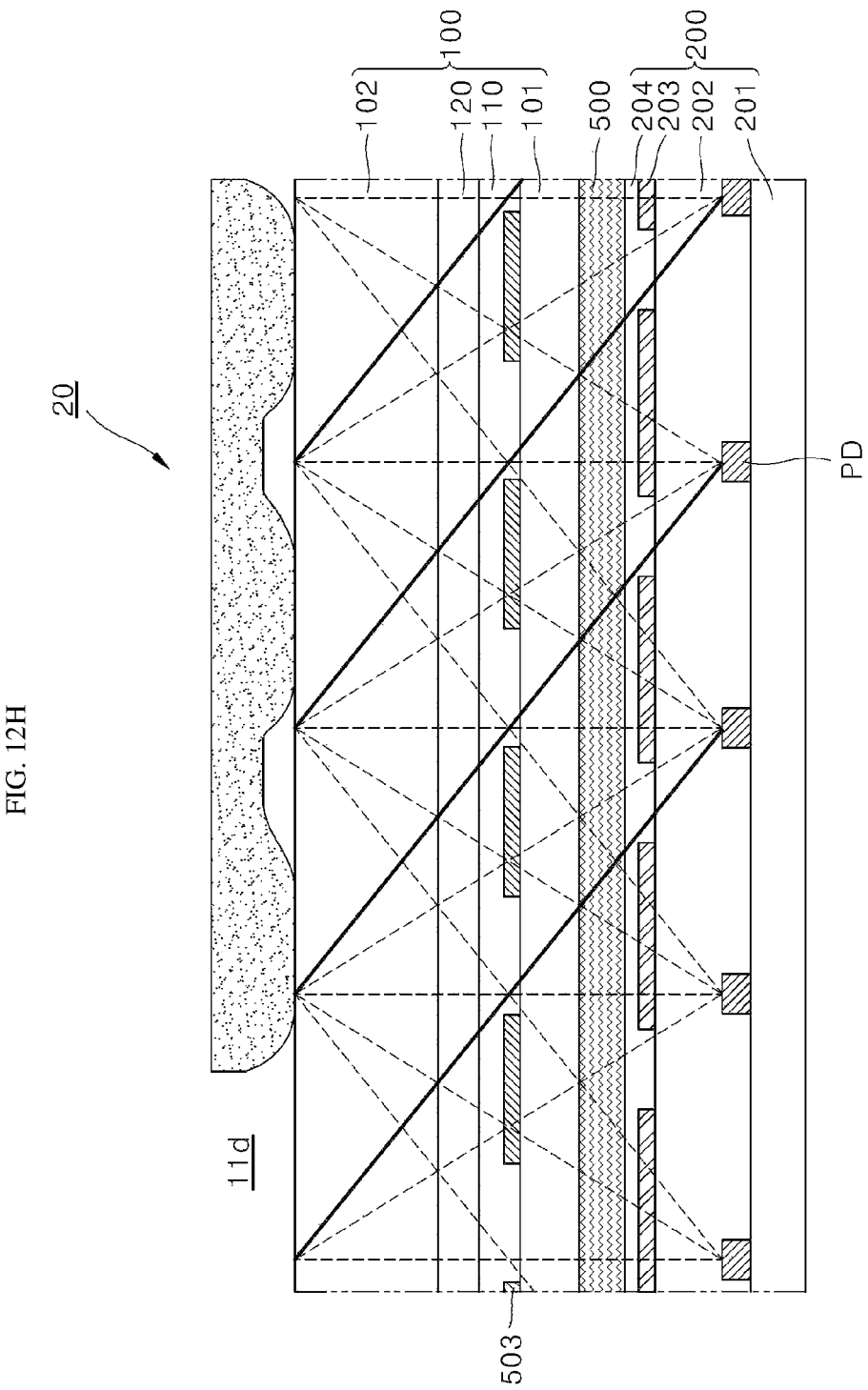

Specifically, FIGS. 12F to 12H illustrate that the first opening pattern OP1 and the second opening pattern OP2 may be newly matched with another light-receiving device PD even though adhesion tolerance significantly increases.

That is, even though a light-sensing unit 200 and an image-displaying unit 100 are attached by the above-described first opening pattern OP1 and the second opening pattern OP2, an additional alignment process is not required, or even though an alignment process is simplified, defects of misalignment may significantly decrease, thereby making it possible to sense a fingerprint with excellent sensitivity to signals.

Figure 13:
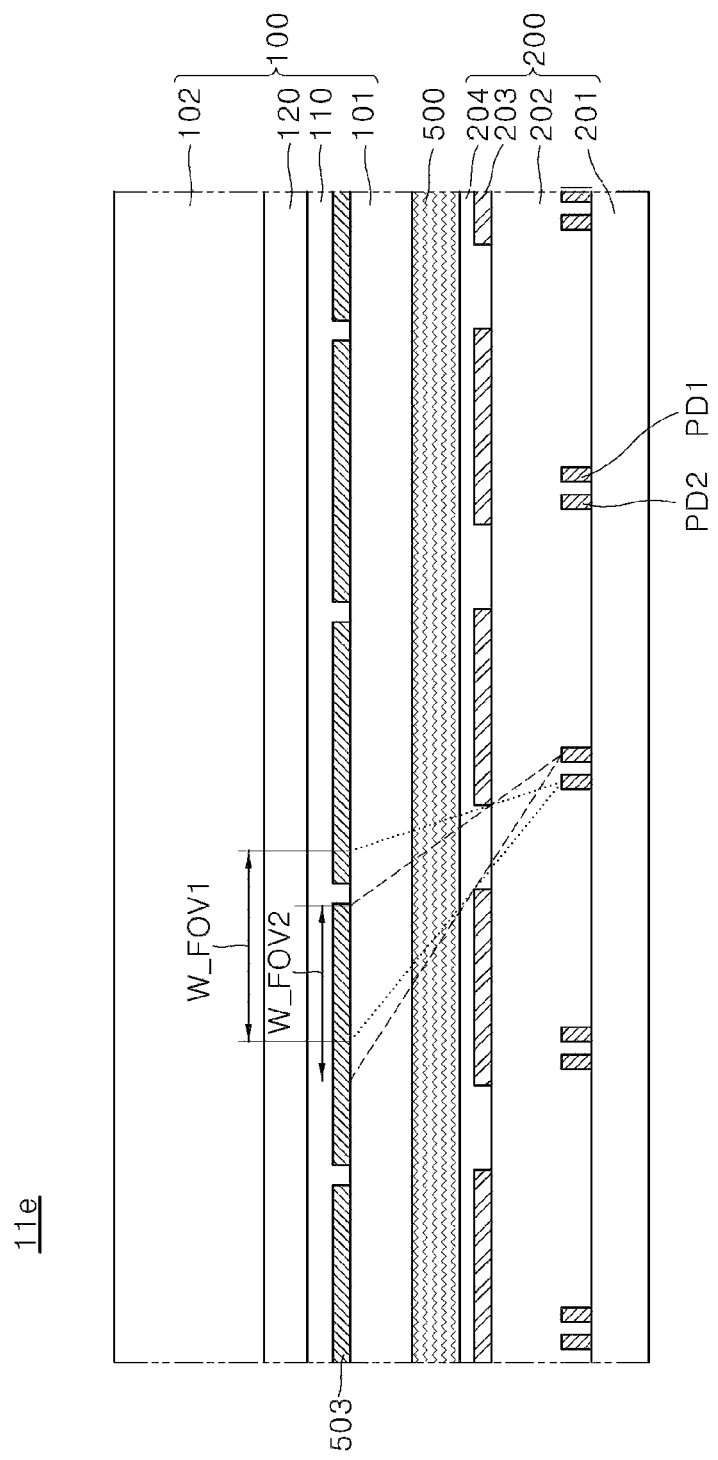
FIG. 13 is a view illustrating a modified fifth aspect of the present disclosure.

FIG. 13 is a view illustrating a modified aspect of the fifth aspect. Referring back to FIG. 12A, when an edge of a width of a second light shielding area W_LS2 is exactly aligned with extension lines which connect a light-receiving device PD and an edge of a first opening pattern OP1, the light-receiving device PD may not substantially receive light.

According to the modified aspect of the fifth aspect in FIG. 13, in the display panel 11e, a single light-receiving device PD may have a structure in which a plurality of sub light-receiving devices (PD1, and PD2) are clustered. The number of the plurality of clustered sub light-receiving devices is not limited. A first sub light-receiving device (PD1) has first angle of view (W_FOV1) which corresponds to a first opening pattern OP1. A second sub light-receiving device (PD2) has second angle of view (W_FOV2) which corresponds to a first opening pattern OP1. Accordingly, even when the edge of the width of the second light shielding area W_LS2 is exactly aligned with extension lines which connect the light-receiving device PD and the edge of the first opening pattern OP1, at least one of the plurality of sub light-receiving devices (PD1, and PD2) may receive light.

FIG. 14 is a view illustrating another modified aspect of the fifth aspect.

A distance D between light-receiving devices PD may be the same as a total of a width of a first light shielding area W_LS1 and a width of a first opening pattern W_OP1.

Additionally, the distance D between the light-receiving devices PD may be the same as a total of a width of a second light shielding area W_LS2 and a width of a second opening pattern W_OP2.

Referring back to FIG. 14, FIG. 14 illustrates an example of the display panel 11f in which a width of an extension line which connects edges of the light-receiving device PD and the first opening pattern OP1 is the same as the total of the width of the second light shielding area W_LS2 and the width of the second opening pattern W_OP2. That is, the width of the extension line which connects edges of the light-receiving device PD and the first opening pattern OP1 may be the same as the distance D between the light-receiving devices PD.

That is, the width of an extension line may be designed to be at least more than or equal to the width of the first opening pattern W_OP1 as the width of the extension line which connects the center of the light-receiving device PD and the edge of the first opening pattern OP1 is at least less than or equal to a total of the width of the second light shielding area W_LS2 and the width of the second opening pattern W_OP2 at the position of the second light shielding film 503. With the above-described configuration, a signal-to-noise ratio may improve.

In addition, when the edge of the light-receiving device PD and the edge of the second opening pattern OP2 are connected, an effective light-receiving area ARA of a display panel 11f may be set. The effective light-receiving area ARA may be configured to receive only light of an angle more than or equal to total internal reflection for sensing a fingerprint. Additionally, the effective light-receiving area ARA may be configured to receive external noise light of an angle less than or equal to an angle of total internal reflection. That is, when the second opening pattern OP2, the light-receiving device PD, and the first opening pattern OP1 are cyclically arranged, light may be allowed to reach only a single light-receiving device PD in a single second opening pattern OP2.

In other words, when an area of the first opening pattern OP1 has the above-described configuration, light which passes through only a single second opening pattern OP2 may reach a single light-receiving device PD, and even when misalignment of the light-sensing unit 200 and the image-displaying unit 100 increases, a second opening pattern OP2 corresponding to each light-receiving device PD may be automatically matched with each light-receiving device.

That is, the display panel may include a plurality of light-receiving devices, a first light shielding film which covers the plurality of light-receiving devices and which includes a plurality of first opening patterns corresponding to the plurality of light-receiving devices, a second light shielding film which covers the first light shielding film and which includes a plurality of second opening patterns corresponding to the plurality of light-receiving devices and the plurality of first opening patterns, and a plurality of electro-luminescence devices which are disposed above the second light shielding film, which pass through the plurality of second opening patterns and the plurality of first opening patterns and which supply light to the plurality of light-receiving devices.

The first light shielding film may include a first light shielding area which blocks light between adjacent first opening patterns among the plurality of first opening patterns OP1, and the second light shielding film may include a second light shielding area which blocks light between adjacent second opening patterns among the plurality of second opening patterns OP2.

With respect to the second light shielding film, a width of an extension line which connects a single light-receiving device with an edge of a first opening pattern corresponding to the single light-receiving device may be greater than or equal to a width of a first opening pattern corresponding to the single light-receiving device, and may be less than or equal to a total of a width of a second light shielding area corresponding to the single light-receiving device and a width of a second opening pattern corresponding to the single light-receiving device.

A distance between the plurality of light-receiving devices may be the same as a total of a width of the first light shielding area corresponding to each light-receiving device and a width of the first opening pattern corresponding to each light-receiving device.

A distance between the plurality of light-receiving devices may be the same as a total of a width of the second light shielding area corresponding to each light-receiving device and a width of the second opening pattern corresponding to each light-receiving device.

With respect to the second light shielding film, a width of an extension line which connects a single light-receiving device with an edge of the first opening pattern corresponding to the single light-receiving device may be the same as a total of a width of the second light shielding area corresponding to the single light-receiving device and a width of the second opening pattern corresponding to the single light-receiving device.

Each of the plurality of light-receiving devices may include a plurality of sub light-receiving devices.

A width of the effective light-receiving area ARA may be determined on the basis of a target of sensing of the display panel.

The present disclosure is not limited to the above-described aspects and attached drawings. It will be apparent to those skilled in the art to which the present disclosure pertains that various replacements, modifications and changes may be made without departing from the technical spirit of the disclosure.

What is claimed is:

1. A display apparatus including a plurality of display pixel areas and a plurality of light-receiving pixel areas which are arranged in a display area in which an image is displayed, comprising:
   an image-displaying unit configured to display the image and including a plurality of electro-luminescence devices which corresponds to the plurality of display pixel areas; and
   a light-sensing unit disposed below the image-displaying unit,
   wherein the light-sensing unit comprises:
   a plurality of light-receiving devices corresponding to the plurality of light-receiving pixel areas;
   a light shielding film disposed on a transparent film that covers the plurality of light-receiving devices; and
   a plurality of opening patterns corresponding to the plurality of light-receiving devices and formed in the light shielding film,
   wherein at least portion of light which passes through each of the plurality of opening patterns is input to each of the plurality of light-receiving devices corresponding to the each of the plurality of opening patterns.

2. The display apparatus of claim 1, wherein the image-displaying unit comprises a transparent cover member covering the plurality of electro-luminescence devices.

3. The display apparatus of claim 2, wherein each of the light-receiving devices absorbs at least portion of light which is generated in an effective light-receiving area corresponding to each of the opening patterns disposed on an upper surface of the transparent cover member.

4. The display apparatus of claim 3, wherein a width of the effective light-receiving area is determined based on a sensing target of a display panel.

5. The display apparatus of claim 2, wherein the each of the light-receiving devices overlaps the light shielding film,
   wherein a minimum angle between lines which connect an edge of each of the opening patterns and an edge of each of the light-receiving devices and a normal line of an upper surface of the transparent cover member is greater than a predetermined critical angle, and
   wherein the a minimum angle is an opening-pattern minimum available incidence angle, and the predetermined critical angle is determined by a medium which contacts the upper surface of the transparent cover member, and the transparent cover member.

6. The display apparatus of claim 2, wherein the opening pattern overlaps at least portion of each of the light-receiving devices.

7. The display apparatus of claim 6, wherein a central point of the opening pattern overlaps a central point of a light-receiving surface of each of the light-receiving devices and the central point is where light is input.

8. The display apparatus of claim 2, wherein the image-displaying unit further comprises:
   a thin-film transistor array including a plurality of thin-film transistors which corresponds to the plurality of display pixel areas; and
   a bank disposed over the thin-film transistor array.

9. The display apparatus of claim 8, wherein each of the electro-luminescence devices comprises:
   a first electrode disposed on the thin-film transistor array;
   an electro-luminescence layer disposed on the first electrode; and
   a second electrode disposed on the electro-luminescence layer,
   wherein the bank covers an edge of the first electrode of each of the electro-luminescence devices.

10. The display apparatus of claim 2, further comprising a protective film disposed between the plurality of electro-luminescence devices and the transparent cover member,
    wherein the protective film includes an encapsulation configured to protect the plurality of electro-luminescence devices.

11. The display apparatus of claim 1, further comprising a wavelength selective transmission film disposed between the image-displaying unit and the light-sensing unit, reflecting light in a range of infrared rays, and transmitting light in a range of visible light, which are emitted from the image-displaying unit toward the light-sensing unit.

12. The display apparatus of claim 1, wherein the light-sensing unit further comprises at least one supplementary electro-luminescence device disposed over the light shielding film.

13. The display apparatus of claim 1, wherein each of the light-receiving devices comprises:
    a first electrode;
    a PIN junction layer disposed above the first electrode; and
    a second electrode disposed above the PIN junction layer.

14. The display apparatus of claim 1, further comprising a supplementary light shielding film included in the image-displaying unit and including a plurality of supplementary opening patterns corresponding to the plurality of opening patterns of the light shielding film.

15. The display apparatus of claim 1, wherein the light-sensing unit further comprises a pattern protective film which covers the plurality of opening patterns.

16. The display apparatus of claim 1, wherein each opening pattern is disposed in an area of the light shielding film, which does not overlap each light-receiving device, and a width of each opening pattern corresponds to a width of each light-receiving device.

17. A display apparatus, comprising:
    a plurality of light-receiving devices;
    a first light shielding film configured to cover the plurality of light-receiving devices and including a plurality of first opening patterns which correspond to the plurality of light-receiving devices;
    a second light shielding film configured to cover the first light shielding film and including a plurality of second opening patterns which correspond to the plurality of light-receiving devices and the plurality of first opening patterns; and
    a plurality of electro-luminescence devices disposed over the second light shielding film,
    wherein light emitted from each of the electro-luminescence devices is received in the each of the light-receiving devices through a path which penetrates each of the first opening patterns and each of the second opening patterns.

18. The display apparatus of claim 17, wherein the first light shielding film has a first light shielding area configured to shielding light between adjacent first opening patterns among the plurality of first opening patterns,
    wherein the second light shied film has a second light shielding area configured to shielding light between adjacent second opening patterns among the plurality of second opening patterns.

19. The display apparatus of claim 18, wherein the second light shielding film has a width of an extension line which connects a single light-receiving device with an edge of a first opening pattern corresponding to the single light-receiving device that is greater than or equal to a width of the first opening pattern corresponding to the single light-receiving device, and is less than or equal to a total of a width of a second light shielding area corresponding to the single light-receiving device and a width of a second opening pattern corresponding to the single light-receiving device.

20. The display apparatus of claim 18, wherein a distance between the plurality of light-receiving devices is the same as a sum of a width of a first light shielding area corresponding to each light-receiving device and a width of a first opening pattern corresponding to each light-receiving device.

21. The display apparatus of claim 18, wherein a distance between the plurality of light-receiving devices is the same as a total of a width of a second light shielding area corresponding to each light-receiving device and a width of a second opening pattern corresponding to each light-receiving device.

22. The display apparatus of claim 18, wherein the second light shielding film has a width of an extension line which connects a single light-receiving device with an edge of a first opening pattern corresponding to the single light-receiving device that is the same as a sum of a width of a second light shielding area corresponding to the single light-receiving device and a width of a second opening pattern corresponding to the single light-receiving device.

23. The display apparatus of claim 17, wherein each of the plurality of light-receiving devices comprises a plurality of sub light-receiving devices.

24. The display apparatus of claim 17, wherein a single first opening pattern which is formed in the first light shielding film corresponds to a single second opening pattern which is formed in the second light shielding film.

\* \* \* \* \*